United States Patent
Motallebi et al.

(10) Patent No.: US 9,099,740 B1
(45) Date of Patent: Aug. 4, 2015

(54) HOMOMETALLIC CYANIDE-CONTAINING INORGANIC POLYMERS AND RELATED COMPOUNDS

(71) Applicant: Alveo Energy, Inc., Palo Alto, CA (US)

(72) Inventors: Shahrokh Motallebi, Los Gatos, CA (US); Colin Deane Wessells, Palo Alto, CA (US); Ali Firouzi, Saratoga, CA (US)

(73) Assignee: Alveo Energy, Inc., Palo Alto, CA (US)

(*) Notice: Subject to any disclaimer, the term of this patent is extended or adjusted under 35 U.S.C. 154(b) by 0 days.

(21) Appl. No.: 14/523,825

(22) Filed: Oct. 24, 2014

(51) Int. Cl.
| H01M 4/58 | (2010.01) |
| H01M 4/62 | (2006.01) |
| H01M 4/136 | (2010.01) |
| H01M 4/137 | (2010.01) |
| H01B 1/06 | (2006.01) |

(52) U.S. Cl.
CPC . *H01M 4/58* (2013.01); *H01B 1/06* (2013.01); *H01M 4/136* (2013.01); *H01M 4/137* (2013.01); *H01M 4/622* (2013.01)

(58) Field of Classification Search
CPC ....... H01M 4/136; H01M 4/137; H01M 4/58; H01M 4/623; H01M 4/625; H01B 1/06; H01B 1/08
USPC ...................... 429/217, 219–225, 229, 231.6; 252/182.1, 518.1–521.6
See application file for complete search history.

(56) References Cited

U.S. PATENT DOCUMENTS

| 2012/0328936 A1* | 12/2012 | Wessells et al. ............... 429/188 |
| 2014/0220392 A1* | 8/2014 | Wessells et al. ................ 429/50 |

OTHER PUBLICATIONS

Journal of Chemical Physics (1975), 63(11), 4366-72 Jain et al., EPR of low spin d 7 Fe+, Co2+, and Ni3+ cyanide complexes in NaCl and KCl.*
14523825-472040-EICSEARCH—STIC Search #1.*
14523825-472567-EICSEARCH—STIC Search #2.*
Lee, Hyun-Wook, et al. Manganese hexacyanomanganate open framework as a high-capacity positive electrode material for sodium-ion batteries. Nature communications 5 (2014).*
Halpern, J., and Nakamura, S. Transient Intermediates in Inner-Sphere Electron-Transfer Reactions Involving Polyatomic Bridging Ligands. Journal of the American Chemical Society, vol. 87 issue 13, pp. 3002-3003 (1965).
Shriver, D.F. "The ambident nature of cyanide", in Structure and Bonding, vol. 1, pp. 32-58. Springer Berlin Heidelberg (1966). ISBN 978-3-540-03675-3.

* cited by examiner

*Primary Examiner* — Miriam Stagg
*Assistant Examiner* — Anne R Dixon
(74) *Attorney, Agent, or Firm* — Patent Law Offices of Michael E. Woods; Michael E. Woods

(57) ABSTRACT

A composition, compound, device, and uses thereof according to $A_x Mn_{(y-k)} M^j_k [Mn^m(CN)_{(6-p)}(NC)_p]_z \cdot (Vac)_{(1-z)} \cdot nH_2O$ (wherein Vac is a $Mn(CN)_{(6-p)}(NC)_p$ vacancy); wherein: A=Na, K, Li; and M=Mg, Al, Ca, Sc, Ti, V, Cr, Fe, Co, Ni, Cu, Zn, Ga, Pd, Ag, Cd, In, Sn, Pb; and wherein $0 < j \leq 4$; $0 \leq k \leq 0.1$; $0 \leq p \leq 3$; $0 < x \leq 4$; $0 \leq y \leq 1$; $0 < z \leq 1$; $0 < n \leq 6$; and wherein: $x+2(y-k)+jk+(m-6)z=0$.

10 Claims, 14 Drawing Sheets

| Material | Primary Phase | Na⁺ | K⁺ | Mn²⁺ | [Mn(CN)₆]⁴⁻ | Vacancy | Water |
|---|---|---|---|---|---|---|---|
| a | Cubic | 1.41 | 0 | 1.00 | 0.83 | 0.17 | 3.41 |
| g | Monoclinic | 1.69 | 0 | 1.00 | 0.91 | 0.09 | 2.86 |
| i | Cubic | 1.37 | 0 | 1.00 | 0.89 | 0.11 | 3.85 |
| j | Cubic | 0 | 1.33 | 1.00 | 0.78 | 0.22 | 2.30 |
| k | Monoclinic | 0 | 1.35 | 1.00 | 0.69 | 0.31 | 1.10 |

*FIG. 6*

HOMOMETALLIC CYANIDE-CONTAINING INORGANIC POLYMERS AND RELATED COMPOUNDS

FIELD OF THE INVENTION

The present invention relates generally to a composition, a composite prepared from the composition, an electrode using the composition or composite, an electrochemical structure using the electrode, and a rechargeable cell including the electrochemical device, among other devices and uses for the composition or composite, and more specifically, but not exclusively, to a crystalline homometallic cyanide-containing inorganic polymer composition.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Current trends in battery science continue to produce developments of new materials for energy storage technologies that provide safe, economic, and energy efficient storage solutions. Although recent developments on cyanide-bridged coordination polymer electrodes for aqueous-based electrolyte batteries suggest a possibility of promising results, many challenging issues need to be addressed. Relatively rapid fade rates of the electrode, thermal decomposition of active material as well as difficulties to process and handle the material in the presence of oxygen are some major technical and safety concerns with these materials.

For example, in some situations, thermal stability is important, particularly for a compound that is used in a situation where components manufactured with this material may be exposed to elevated temperatures, for example at temperatures from 100-120 C and above. It is common for cyanide-containing electrode materials to begin to release hydrogen cyanide at temperatures in this range.

What is needed is a composition having an excellent energy efficiency, an improved fade rate as well as a very good thermal stability.

BRIEF SUMMARY OF THE INVENTION

Disclosed is a composition having an excellent energy efficiency, an improved fade rate as well as a very good thermal stability.

The following summary of the invention is provided to facilitate an understanding of some of technical features related to the composition, a composite from the composition, methods of making and using the composition and composites, and structures and elements made using the composition and composites, and is not intended to be a full description of the present invention. A full appreciation of the various aspects of the invention can be gained by taking the entire specification, claims, drawings, and abstract as a whole. The present invention is applicable to other composites, methods of use, and structures and elements in addition to their possible uses in device applications such as rechargeable battery devices, electrochromic devices, molecular magnets and nanowires.

The products and methods of the present invention include a composition of a homometallic cyanide-containing inorganic polymer of the following formula:

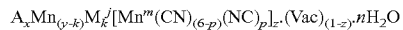

wherein, each A is an independently selected alkali metal, for example, Li, Na, or K; and each dopant M may optionally be at least one independently selected alkaline earth metal, for example, Mg or Ca, a post-transition metal, for example, Al, Ga, In, Sn, or Pb, or a transition metal, for example, Sc, Ti, V, Cr, Fe, Co, Ni, Cu, Zn, Pd, Ag, or Cd having an average valence j; and wherein $0<j\leq4$, $0\leq k\leq0.1$, $0\leq p\leq3$, $0<x\leq4$, $0<y\leq1$, $0<z\leq1$, and $0\leq n\leq6$; wherein $x+2(y-k)+jk+(m-6)z=0$; and wherein the formula includes one or more $Mn(CN)_{(6-p)}(NC)_p$ complexes each including an Mn atom, and wherein p is an average number of NC groups found in the one or more $Mn(CN)_{(6-p)}(NC)_p$ complexes; and wherein m is an average valence of the Mn atoms found in the one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes the Mn atom bonded to a plurality of cyanide groups and, when $p>0$, the Mn atom bonded to one or more isocyanide groups.

An optimum structure for these compositions corresponds to a minimum amount of vacancies which will result in an enhanced performance. The products of the present invention include very well faceted crystal structures with a grain size of >200 nm and preferably more than 1 micron. The crystal structures of these compositions are face-centered cubic, monoclinic or mixture of face-centered cubic and monoclinic structures.

These compositions are capable of storing ions. Ion insertion/extraction accompanied by oxidation-reduction of these polymers make these products good candidates as electrode compositions and compounds for rechargeable batteries, among other uses and structures.

In certain applications, one important aspect of the present invention is related to a thermal stability of the compositions, which upon heating at high temperature do not release hydrogen cyanide. For example, the high thermal stability of these compositions is often a very important safety aspect for rechargeable battery technology especially in applications having personnel nearby (e.g., electric/hybrid passenger vehicles).

The intrinsic crystal structures of these compositions influence their electrochemical properties. Small number of vacancies in the polymers frameworks of the present invention, which is attributed to well-controlled synthetic methods, resulted in enhanced electrochemical performances of these polymers.

A material, including at least one composition represented by Formula I:

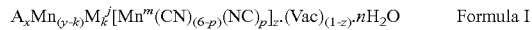

Formula I wherein, in Formula I, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0<j\leq4$, $0\leq k\leq0.1$, $0<p\leq3$, $0<x\leq4$, $0<y\leq1$, $0<z\leq1$, and $0\leq n\leq6$; wherein $x+2(y-k)+jk+(m-6)z=0$; and wherein Formula I includes one or more $Mn(CN)_{(6-p)}(NC)_p$ complexes each including an Mn atom, and wherein p is an average number of NC groups found in the one or more $Mn(CN)_{(6-p)}(NC)_p$ complexes; and wherein m is an average valence of the Mn atoms found in the one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes the Mn atom bonded to a plurality of cyanide groups and bonded to one or more isocyanide groups.

An electrode, including a current collector; and a compound applied on the current collector, the compound including a composition, a binder, an electrically conductive material, and a solvent, wherein the composition includes a homometallic cyanide-containing inorganic polymer as described herein.

An electrode, including a current collector; and a composite applied on the current collector, the composite including an electrochemically active material having a composition, a binder, and an electrically conductive material, wherein the composition comprises at least one composition represented by Formula I:

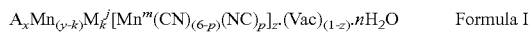
$$A_xMn_{(y-k)}M_k^j[Mn^m(CN)_{(6-p)}(NC)_p]_z \cdot (Vac)_{(1-z)} \cdot nH_2O \qquad \text{Formula I}$$

wherein, in Formula I, each A is an independently selected alkali metal Li, Na, or K; and each dopant M may optionally be at least one independently selected alkaline earth metal Mg or Ca, post-transition metal Al, Ga, In, Sn, or Pb or transition metal Sc, Ti, V, Cr, Fe, Co, Ni, Cu, Zn, Pd, Ag, or Cd having an average valence j; and wherein $0<j\le4$, $0\le k\le0.1$, $0<p\le3$, $0<x\le4$, $0<y\le1$, $0<z\le1$, and $0\le n\le6$; wherein $x+2(y-k)+jk+(m-6)z=0$; and wherein Formula I includes one or more $Mn(CN)_{(6-p)}(NC)_p$ complexes each including an Mn atom, and wherein p is an average number of NC groups found in the one or more $Mn(CN)_{(6-p)}(NC)_p$ complexes; and wherein m is an average valence of the Mn atoms found in the one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes the Mn atom bonded to a plurality of cyanide groups and bonded to one or more isocyanide groups.

Formula I includes a special case of p=0 discussed herein that is identified as Formula II:

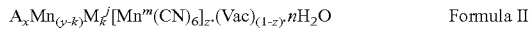
$$A_xMn_{(y-k)}M_k^j[Mn^m(CN)_6]_z \cdot (Vac)_{(1-z)} \cdot nH_2O \qquad \text{Formula II}$$

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0<j\le4$, $0\le k\le0.1$, $0<x\le4$, $0<y\le1$, $0<z\le1$, and $0\le n\le6$; wherein $x+2(y-k)+jk+(m-6)z=0$; and wherein Formula II includes one or more $Mn(CN)_6$ complexes each including an Mn atom; and wherein m is an average valence of the Mn atoms found in the one or more $Mn(CN)_6$ complexes; and wherein (Vac) identifies a $Mn(CN)_6$ vacancy; and wherein each particular $Mn(CN)_6$ complex includes the Mn atom bonded to a plurality of cyanide groups.

A material, including at least one composition represented by Formula II:

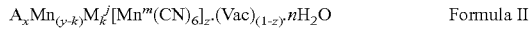
$$A_xMn_{(y-k)}M_k^j[Mn^m(CN)_6]_z \cdot (Vac)_{(1-z)} \cdot nH_2O \qquad \text{Formula II}$$

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0<j\le4$, $0\le k\le0.1$, $0<x\le4$, $0<y\le1$, $0<z\le1$, and $0\le n\le6$; wherein $x+2(y-k)+jk+(m-6)z=0$; and wherein Formula II includes one or more $Mn(CN)_6$ complexes each including an Mn atom; and wherein m is an average valence of the Mn atoms found in the one or more $Mn(CN)_6$ complexes; and wherein (Vac) identifies a $Mn(CN)_6$ vacancy; and wherein each particular $Mn(CN)_6$ complex includes the Mn atom bonded to a plurality of cyanide groups.

An electrode, including a current collector; and a composite applied on the current collector, the composite including an electrochemically active material having a composition, a binder, and an electrically conductive material, wherein the composition comprises at least one composition represented by Formula II:

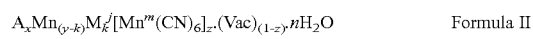
$$A_xMn_{(y-k)}M_k^j[Mn^m(CN)_6]_z \cdot (Vac)_{(1-z)} \cdot nH_2O \qquad \text{Formula II}$$

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0<j\le4$, $0\le k\le0.1$, $0<x\le4$, $0<y\le1$, $0<z\le1$, and $0\le n\le6$; wherein $x+2(y-k)+jk+(m-6)z=0$; and wherein Formula II includes one or more $Mn(CN)_6$ complexes each including an Mn atom; and wherein m is an average valence of the Mn atoms found in the one or more $Mn(CN)_6$ complexes; and wherein (Vac) identifies a $Mn(CN)_6$ vacancy; and wherein each particular $Mn(CN)_6$ complex includes the Mn atom bonded to a plurality of cyanide groups.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3a illustrates a SEM of material a illustrated in FIG. 2;

FIG. 3b illustrates a SEM of material c illustrated in FIG. 2; and

FIG. 3c illustrates a SEM of material h illustrated in FIG. 2;

FIG. 6 illustrates an elemental analysis of various homometallic cyanide-containing inorganic polymers;

FIG. 8a illustrates a cycling of material a illustrated in FIG. 2;

FIG. 8b illustrates a cycling of material c illustrated in FIG. 2; and

FIG. 8c illustrates a cycling of material h illustrated in FIG. 2; and

FIG. 10a illustrates a SEM of the composition produced in example 40;

FIG. 10b illustrates a SEM of the composition produced in example 41; and

FIG. 10c illustrates a SEM of the composition produced in example 42.

DETAILED DESCRIPTION OF THE INVENTION

Figure 1A:
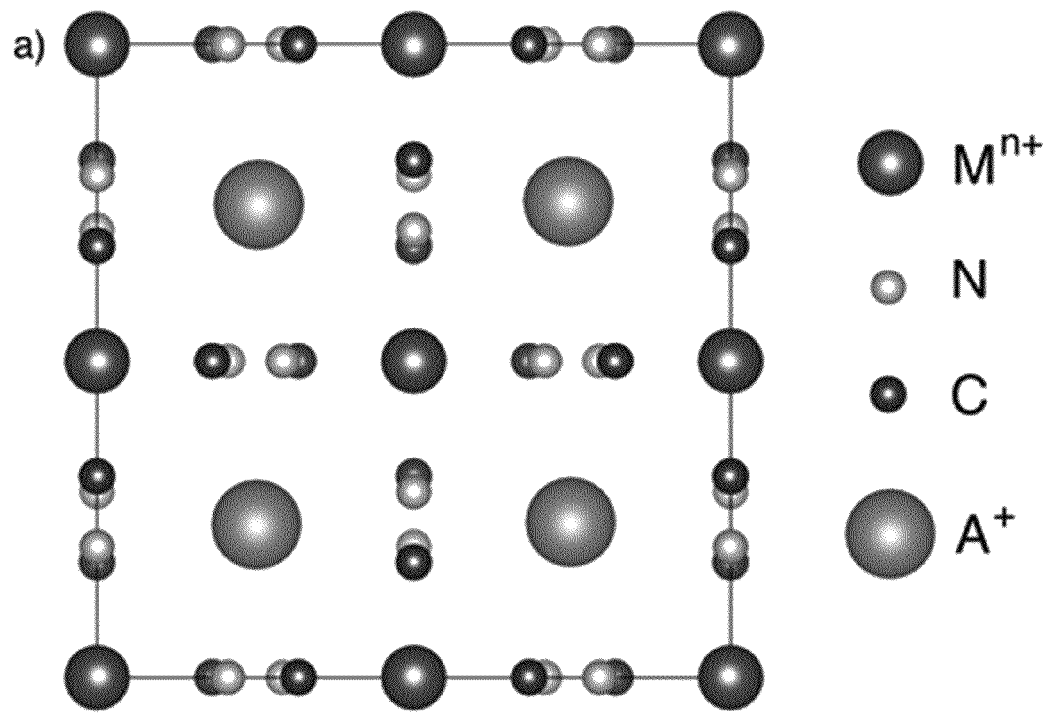
FIG. 1a illustrates a face-centered cubic metal hexacyanometalate crystal structure for a material.

Embodiments of the present invention provide a composition having an excellent energy efficiency, an improved fade rate as well as a very good thermal stability. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

DEFINITIONS

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "battery" means a rechargeable electrochemical device that converts stored chemical energy into electrical energy, including voltaic cells that may each include two half-cells joined together by one or more conductive liquid electrolytes.

As used herein according to an aspect of the present disclosure, the term "homometallic cyanide-containing inorganic polymer" is a composition including at least one compound represented by Formula I, or Formula II (special case of Formula I having p=0) below:

Formula I:

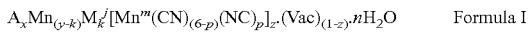

Wherein, in Formula I, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0 < j \leq 4$, $0 \leq k \leq 0.1$, $0 < p \leq 3$, $0 < x \leq 4$, $0 < y \leq 1$, $0 < z \leq 1$, and $0 \leq n \leq 6$; wherein $x+2(y-k)+jk+(m-6)z=0$; and wherein Formula I includes one or more $Mn(CN)_{(6-p)}(NC)_p$ complexes each including an Mn atom, and wherein p is an average number of NC groups found in said one or more $Mn(CN)_{(6-p)}(NC)_p$ complexes; and wherein m is an average valence of said Mn atoms found in said one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes said Mn atom bonded to a plurality of cyanide groups and bonded to one or more isocyanide groups.

Formula II:

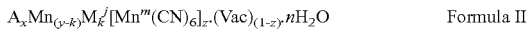

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0 < j \leq 4$, $0 \leq k \leq 0.1$, $0 < x \leq 4$, $0 < y \leq 1$, $0 < z \leq 1$, and $0 \leq n \leq 6$; wherein $x+2(y-k)+jk+(m-6)z=0$; and wherein Formula II includes one or more $Mn(CN)_6$ complexes each including an Mn atom; and wherein m is an average valence of said Mn atoms found in said one or more $Mn(CN)_6$ complexes; and wherein (Vac) identifies a $Mn(CN)_6$ vacancy; and wherein each particular $Mn(CN)_6$ complex includes said Mn atom bonded to a plurality of cyanide groups.

Further, in Formula I and Formula II, the composition or compound includes well-defined shapes and crystals having a grain size greater than 200 nm and more preferably having a size greater than 1 micron. These crystal structures are face-centered cubic, monoclinic, or mixture of face-centered cubic and monoclinic structures. One of the disclosed embodiments includes a preference for $z > 0.8$ and more preferably greater than 0.9.

As used herein, according to an aspect of the present disclosure, the homometallic cyanide-containing inorganic polymer of the present invention, such as represented in Formula I and Formula II, include metal complexes (sometimes alternatively referred to as coordination complexes or coordination entities) that include one or more ligands (for example cyanide groups and/or one or more isocyanide groups) bonded to a complex center, for example, a metal atom or ion. When the ligand is a group such as a cyanide group, or an isocyanide group, the proper nomenclature for such group is relative to and dependent upon, a particular complex center under consideration. As used herein, the term "cyanide" in the context of a ligand in a complex having a complex center, refers to a cyanide anion (CN—) bonded by its carbon end to the complex center. As used herein, the term "isocyanide" in the context of a ligand in a complex having a complex center, refers to a cyanide anion (CN—) bonded by its nitrogen end to the complex center. As described herein for certain embodiments, these cyanide anions of a complex are bonded to adjacent complex centers, therefore a cyanide group for a particular complex center is defined as an isocyanide group for the adjacent complex center sharing the cyanide anion.

Figure 1B:
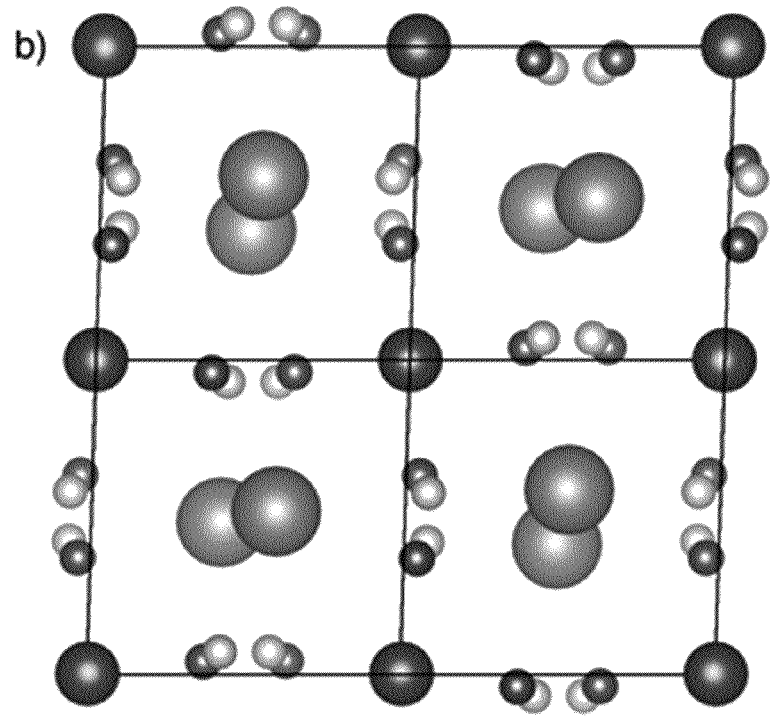
FIG. 1b illustrates a monoclinic homometallic cyanide-containing inorganic polymer structure.

FIG. 1a illustrates a face-centered cubic metal hexacyanometalate crystal structure for a conventional material and FIG. 1b illustrates a monoclinic homometallic cyanide-containing inorganic polymer structure for a material including an embodiment of the present invention.

Figure 2:
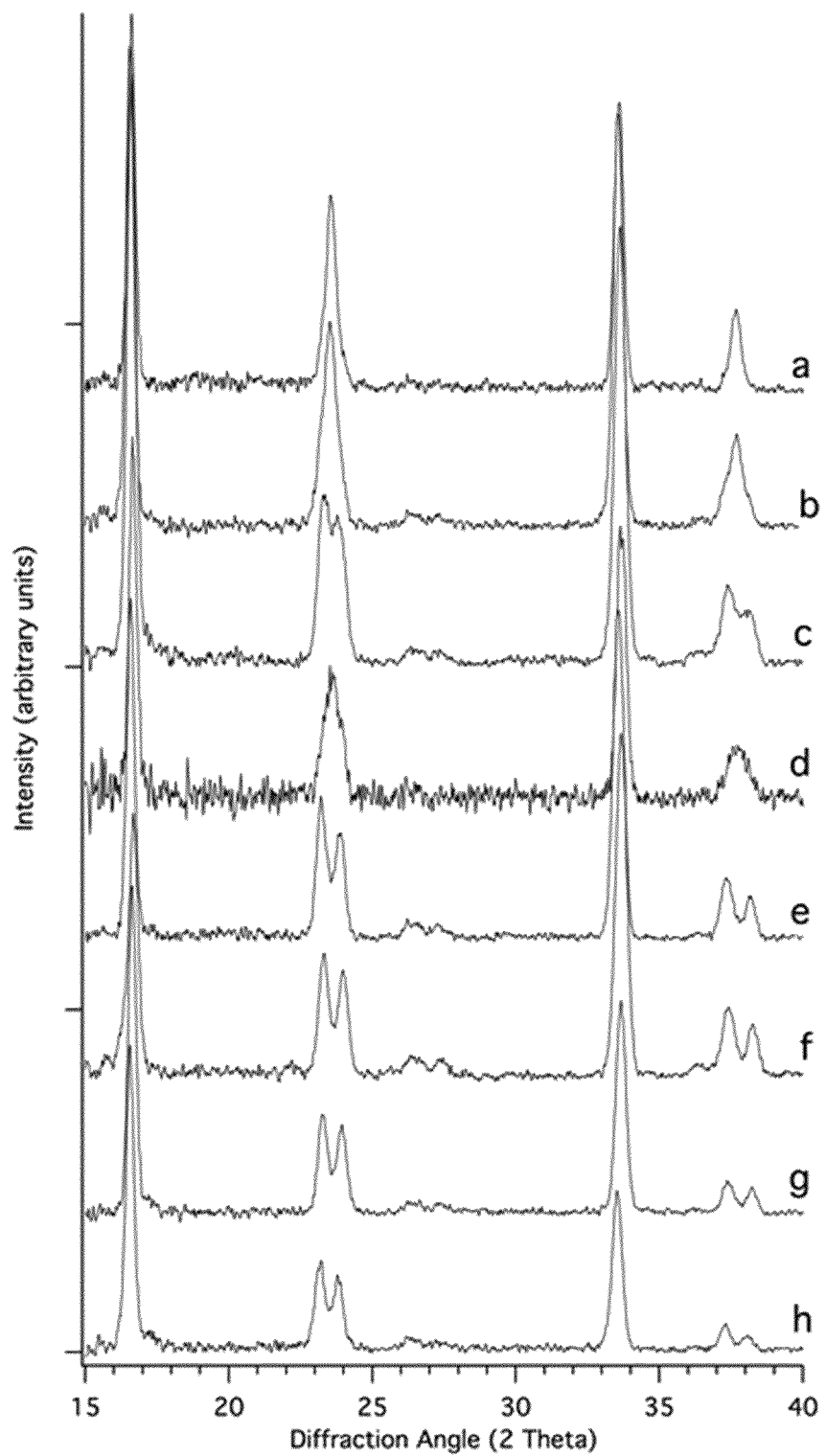
FIG. 2 illustrates an X-ray diffraction (XRD) of various homometallic cyanide-containing inorganic polymer materials a-h.

FIG. 2 illustrates X-ray diffraction (XRD) of various homometallic cyanide-containing inorganic polymers of Formula I, referred to herein as polymer A-polymer H. The diffraction angle peaks correspond to compositions that are face-centered cubic, monoclinic or a mixture of face-centered cubic and monoclinic structures.

Figure 3A:
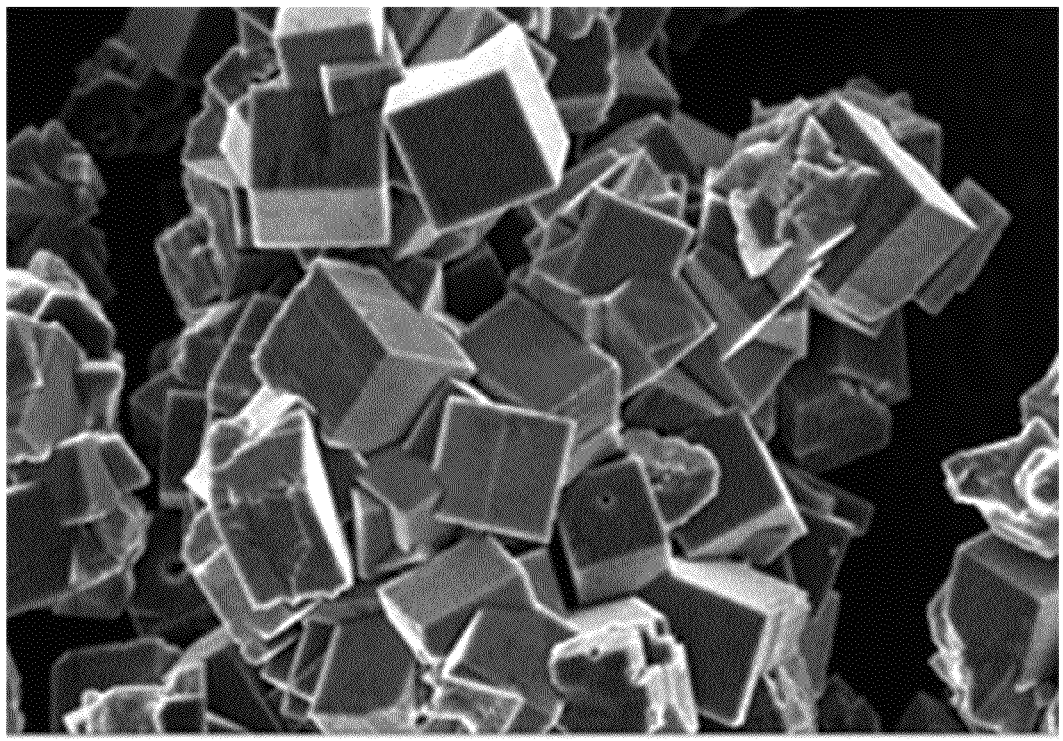
FIG. 3a-3c illustrate scanning electron micrographs (SEMs) of various homometallic cyanide-containing inorganic polymers.
Figure 3B:
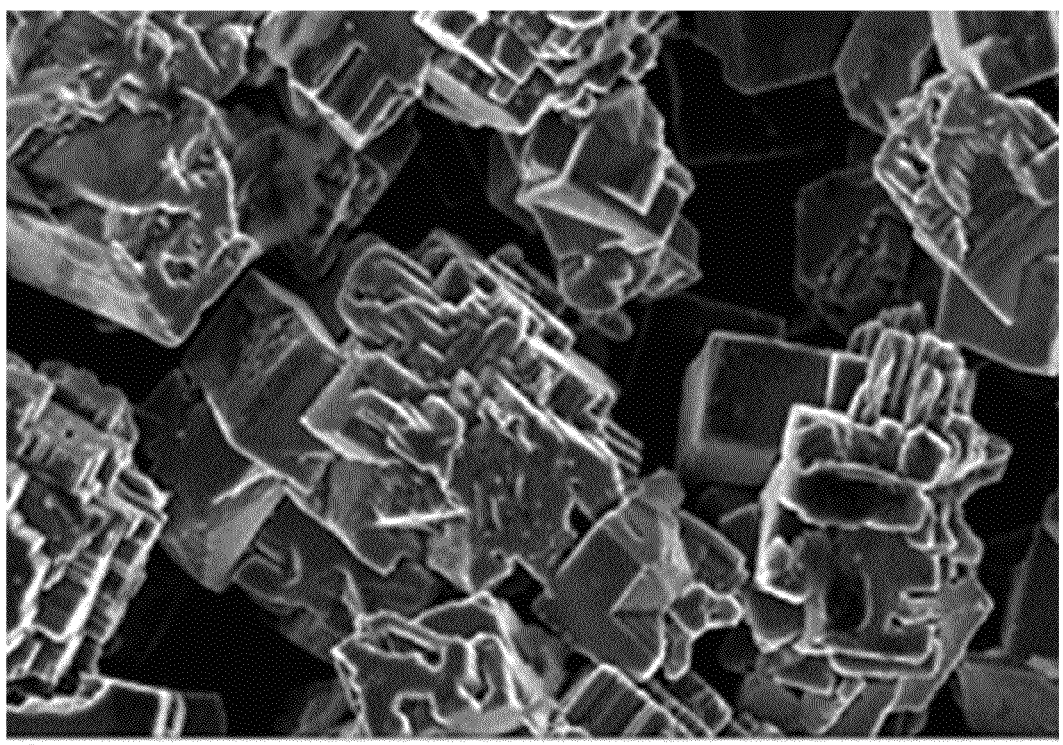
Figure 3C:
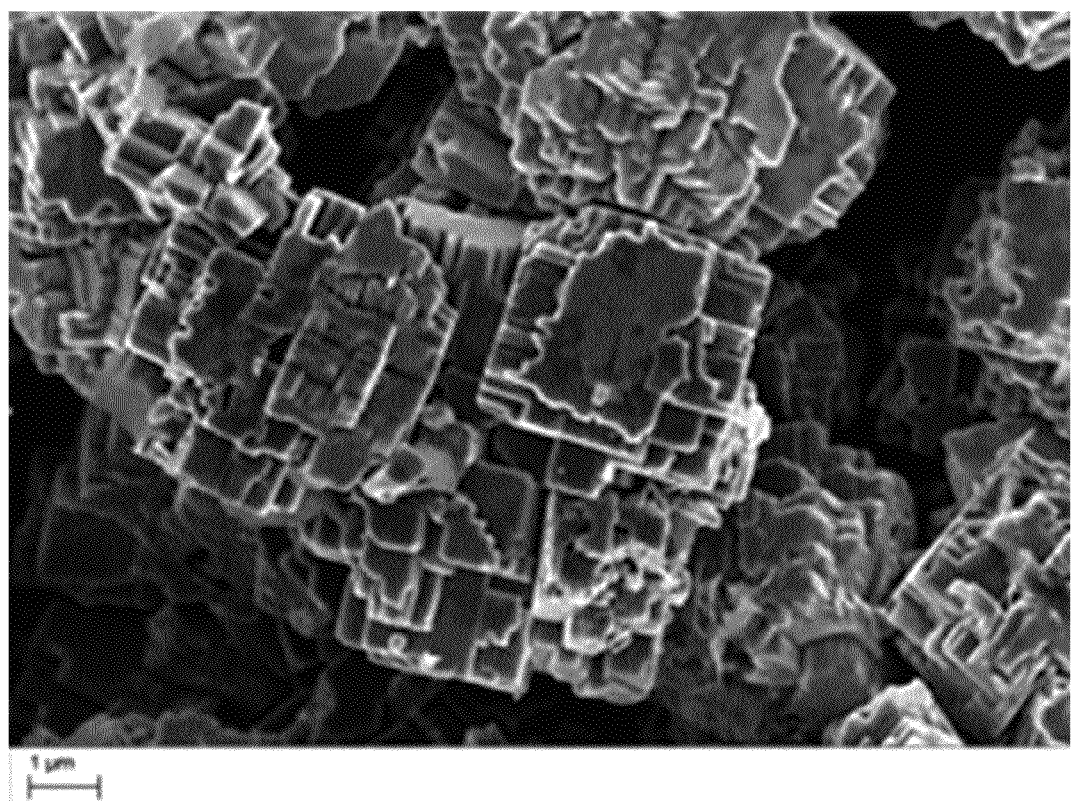

FIG. 3 illustrates scanning electron microscopy (SEM) images of various homometallic cyanide-containing inorganic polymers of Formula I. As seen from the images of FIG. 3a, FIG. 3b, and FIG. 3c, are well-defined shapes having a crystal size greater than 200 nm. FIG. 3a illustrates an SEM of material a illustrated in FIG. 2; FIG. 3b illustrates an SEM of material c illustrated in FIG. 2; and FIG. 3c illustrates an SEM of material h illustrated in FIG. 2.

Figure 4:
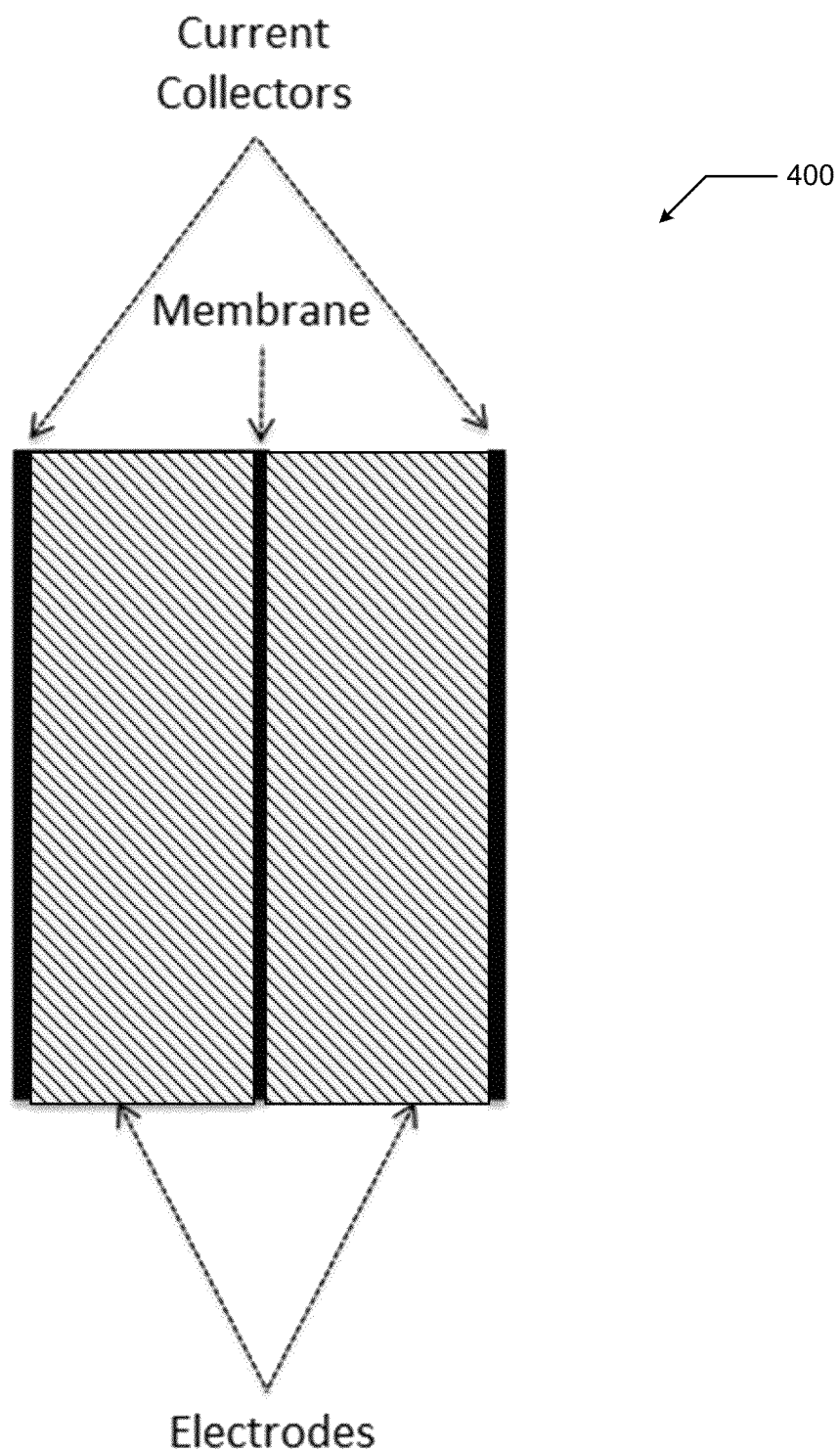
FIG. 4 illustrates a schematic of a battery containing a homometallic cyanide-containing inorganic polymer electrode and a second electrode.

FIG. 4 illustrates a schematic of a battery 400 made from homometallic cyanide-containing inorganic polymers of Formula I. Battery 400 includes a pair of electrodes separated by a membrane, each electrode including a lateral current collector. In battery 400, at least one electrode includes a composition according to Formula I.

Figure 5A:
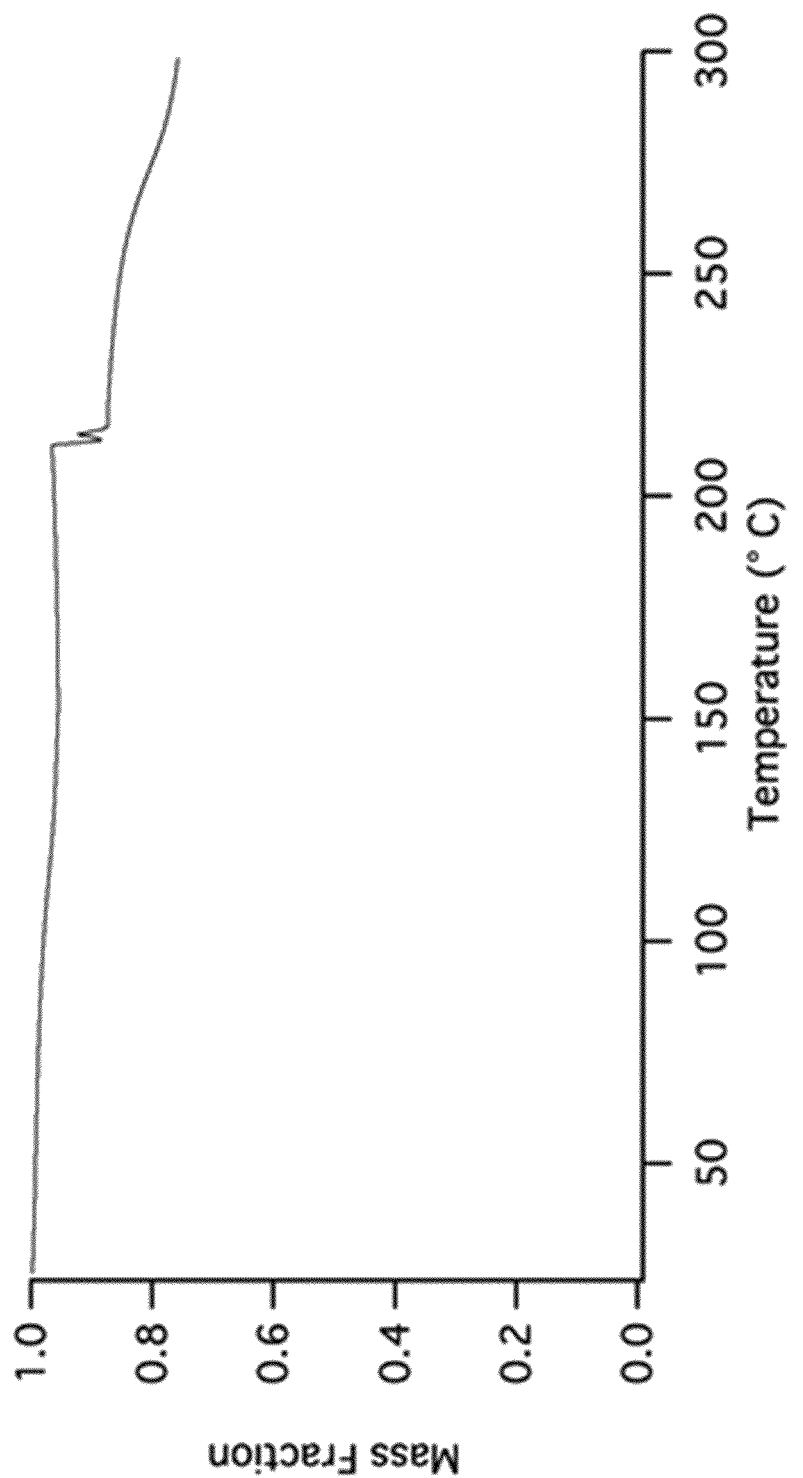
FIG. 5a illustrates a thermogravimetric analysis of material h illustrated in FIG. 2.
Figure 5B:
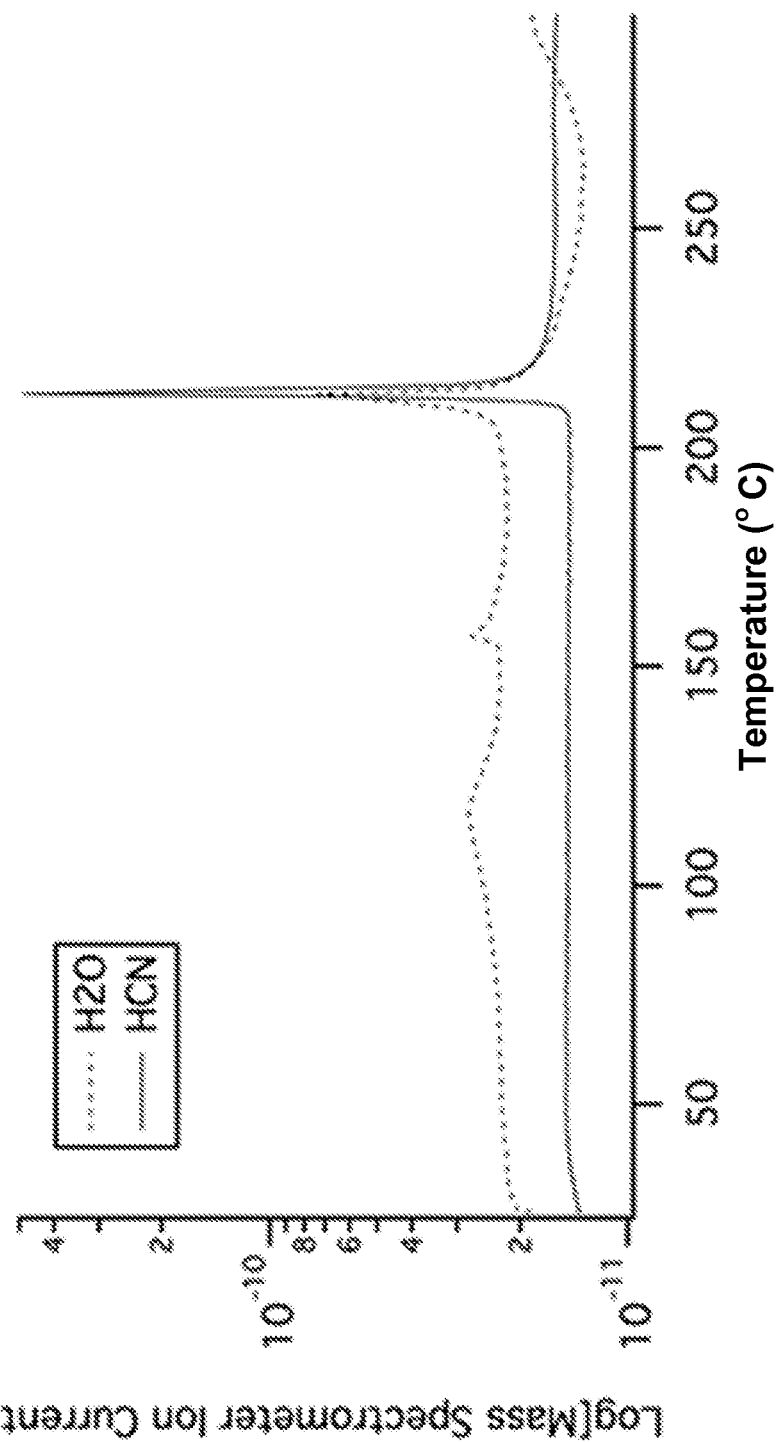
FIG. 5b illustrates a mass spectrometry of material h illustrated in FIG. 2.

FIG. 5a illustrates a thermogravimetric analysis of material h illustrated in FIG. 2; and FIG. 5b illustrates a mass spectrometry of material h illustrated in FIG. 2. These figures demonstrate that these compositions have very good thermal stability and do not release hydrogen cyanide unless heated to high temperatures.

FIG. 6 illustrates an elemental analysis of various homometallic cyanide-containing inorganic polymer compositions according to Formula I. The intrinsic crystal structures of these compositions influence their electrochemical properties. A small number of vacancies resulted in the enhanced electrochemical performances of these compositions as illustrated and described herein. The small number of vacancies is attributed to well-controlled synthetic methods such as those described herein.

Figure 7:
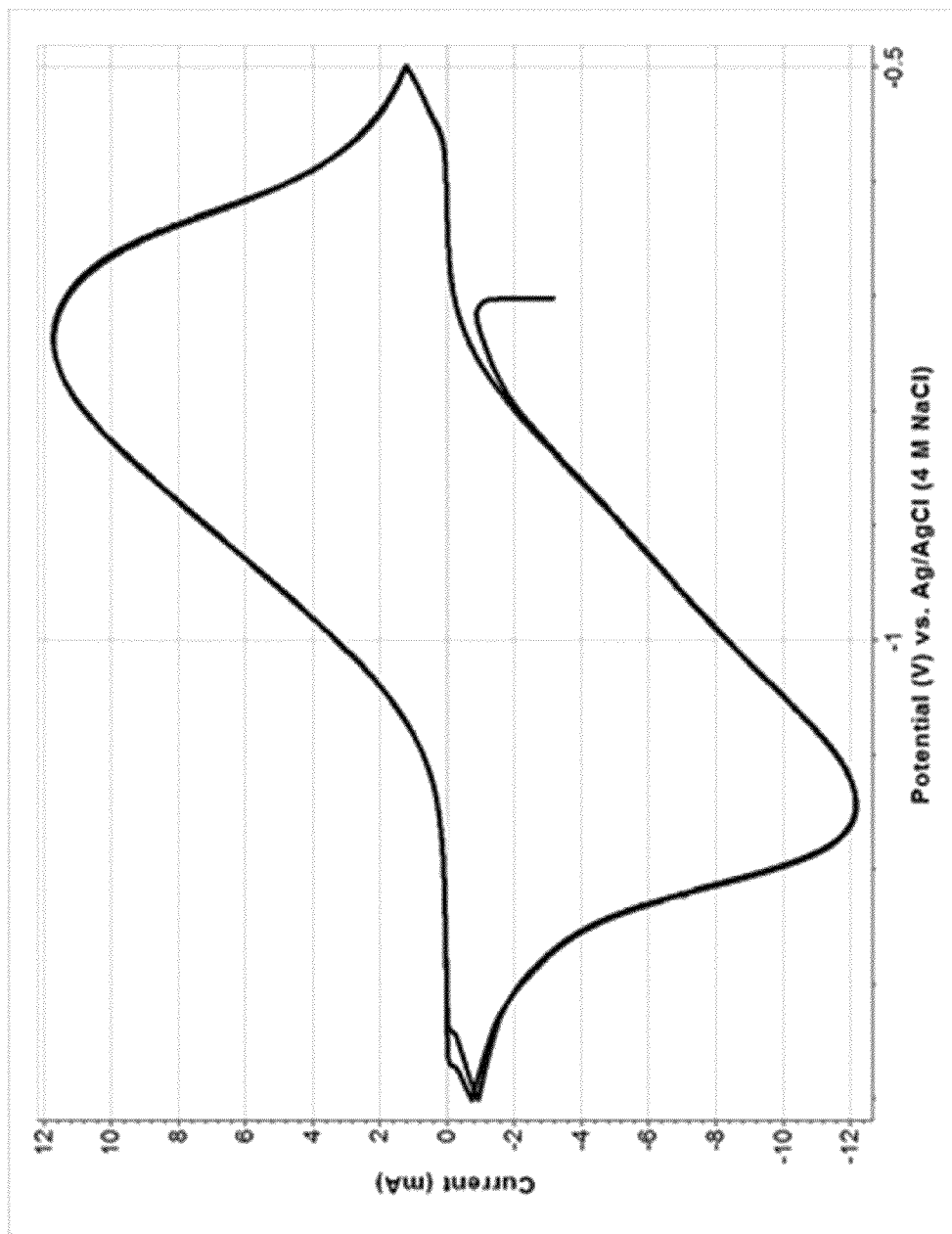
FIG. 7 illustrates a cyclic voltammogram of a homometallic cyanide-containing inorganic polymer electrode.
Figure 8A:
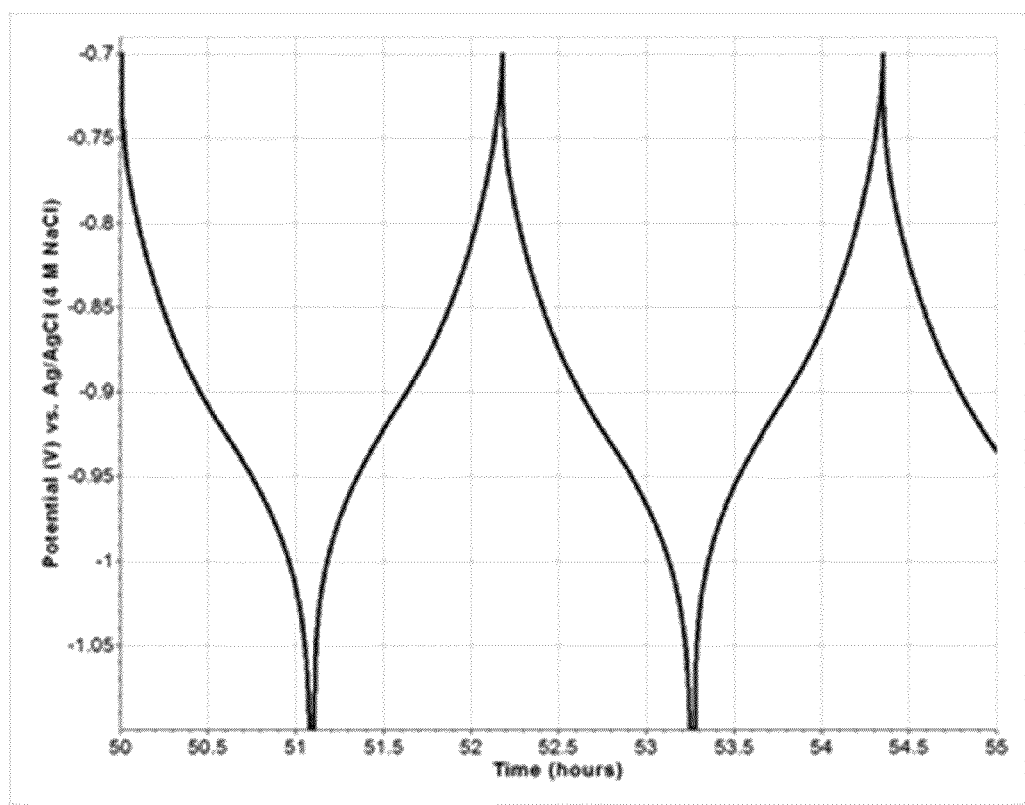
FIG. 8a-FIG. 8c illustrate 1C cycling of various homometallic cyanide-containing inorganic polymer electrodes.
Figure 8B:
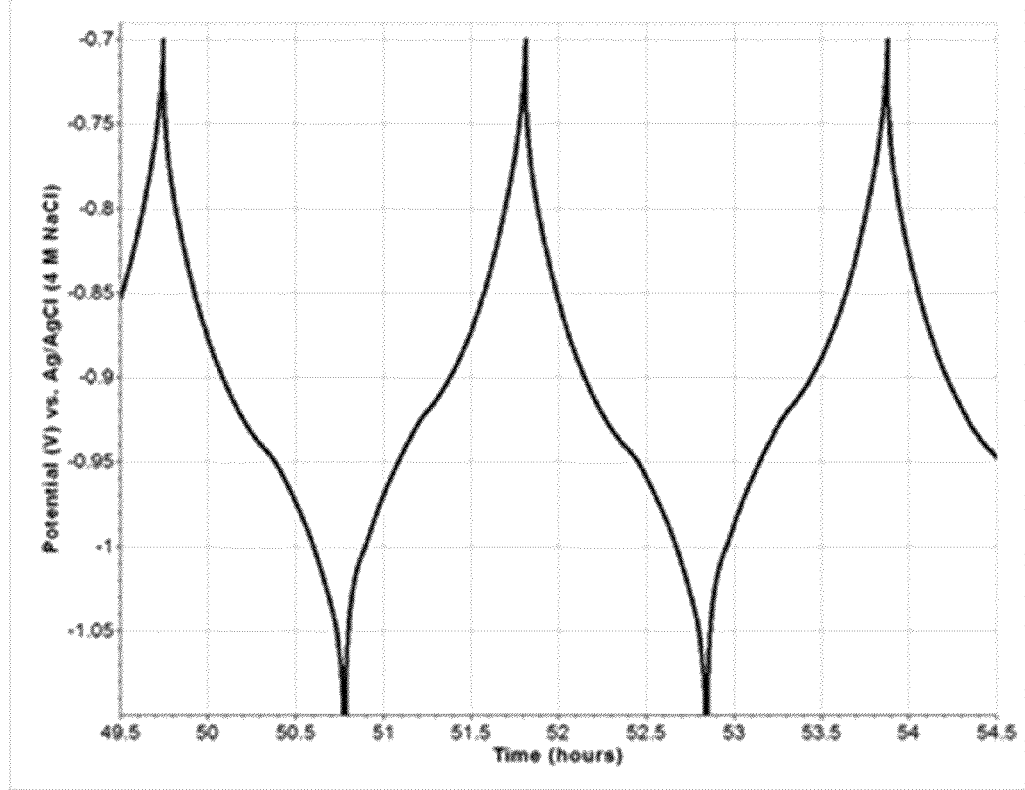
Figure 8C:
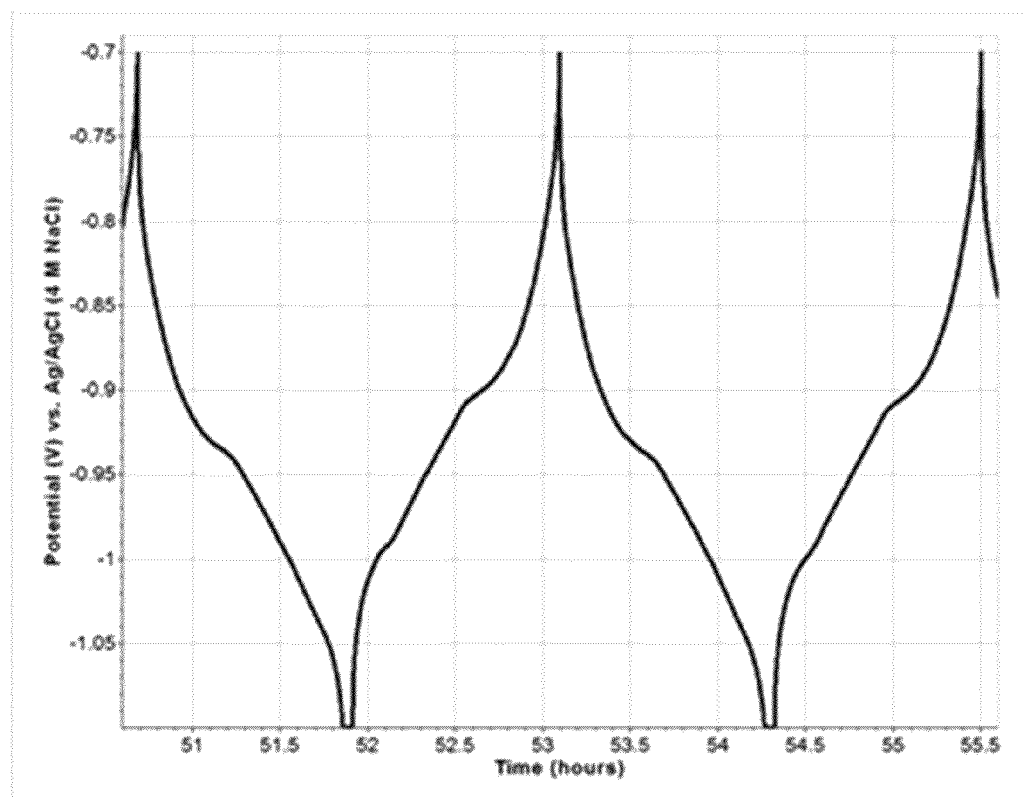
Figure 9:
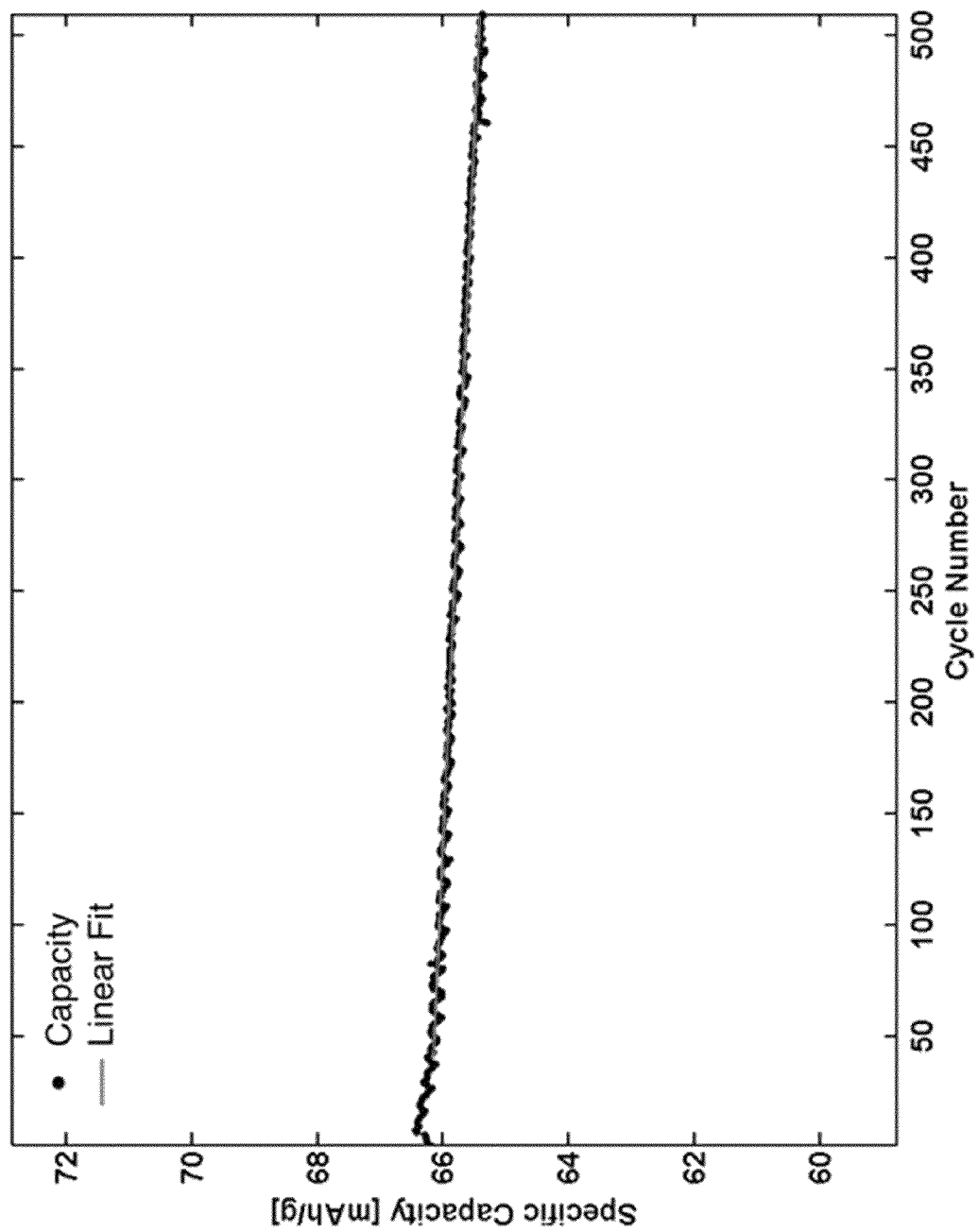
FIG. 9 illustrates specific capacity versus cycling of homometallic cyanide-containing inorganic polymer electrodes.

Some of these enhanced electrochemical properties for the compositions of Formula I are illustrated in FIG. 7-FIG. 9. FIG. 7 illustrates a cyclic voltammogram of a homometallic cyanide-containing inorganic polymer compositions; FIG. 8 illustrates 1C cycling of various homometallic cyanide-containing inorganic polymer composition electrodes; and FIG. 9 illustrates a graph of specific capacity versus cycle number of a homometallic cyanide-containing inorganic polymer composition electrode constructed to include various samples of a homometallic cyanide-containing inorganic polymer composition electrode.

Figure 10A:
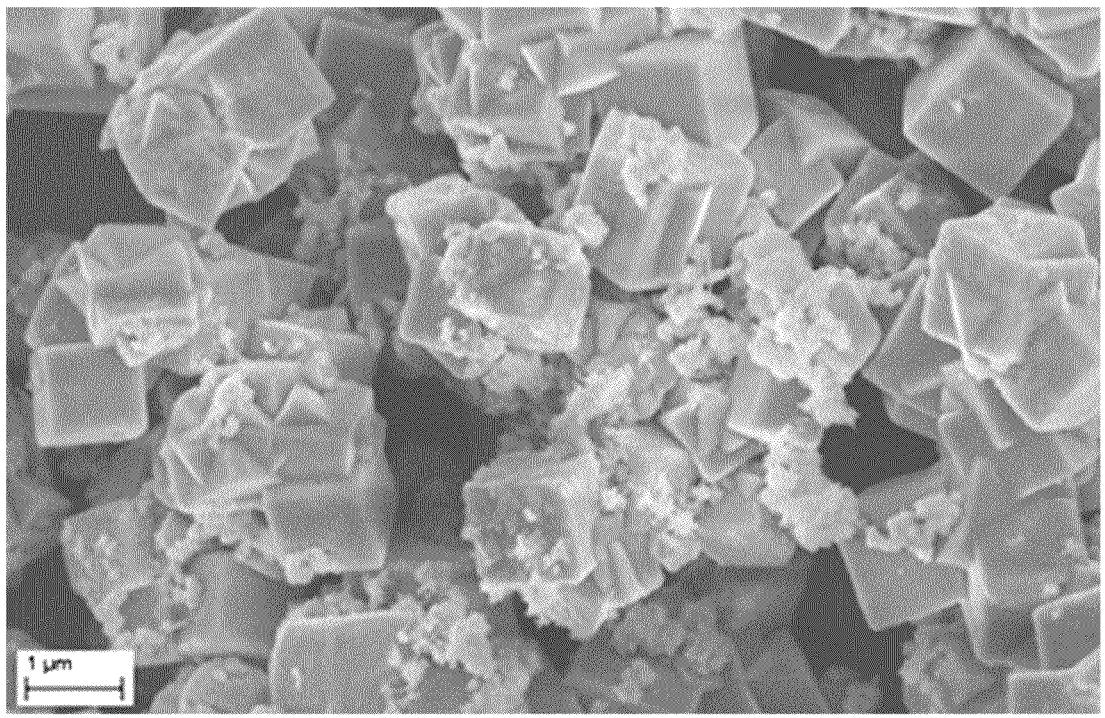
FIG. 10a-FIG. 10c illustrate scanning electron micrographs (SEMs) of various homometallic cyanide-containing inorganic polymers.
Figure 10B:
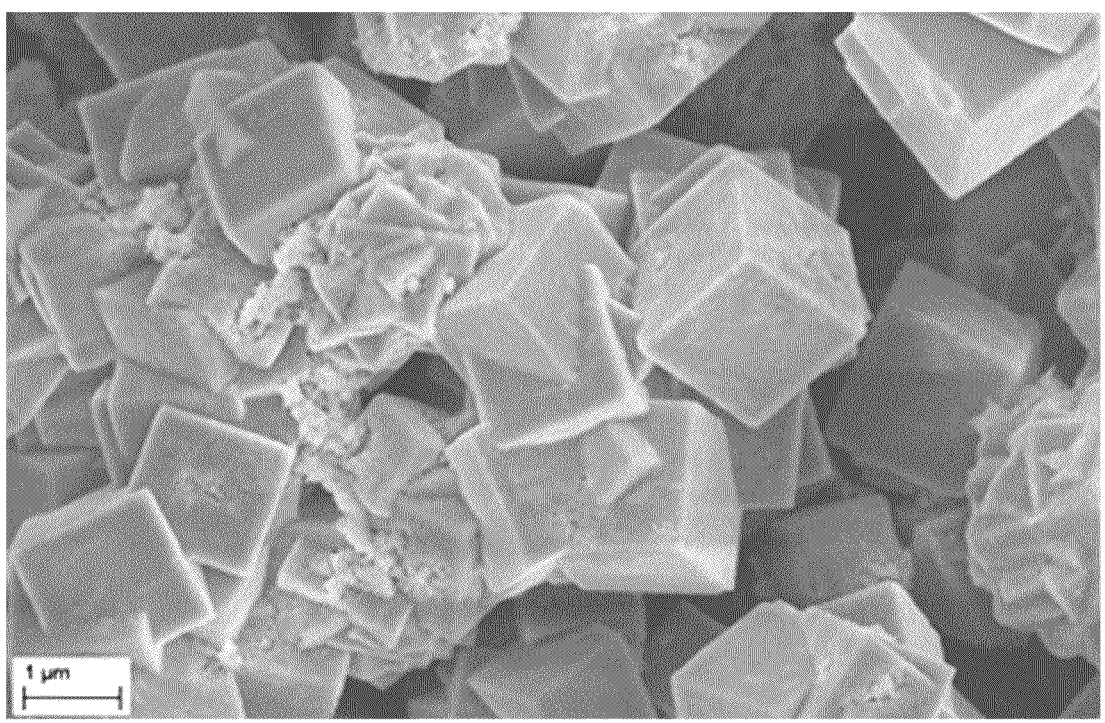
Figure 10C:
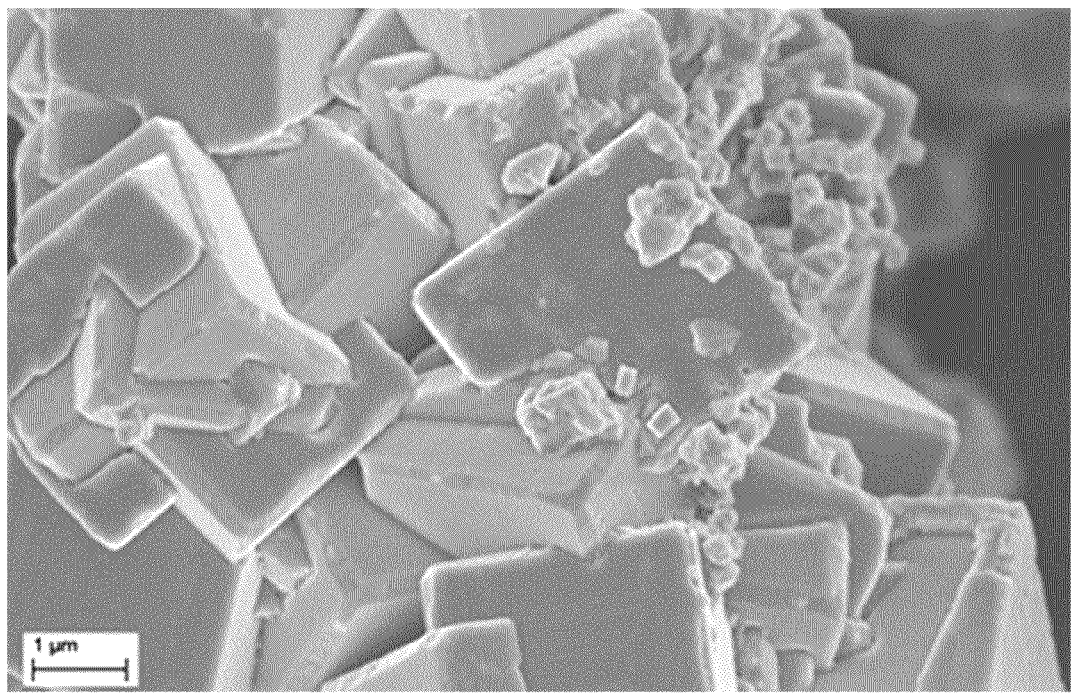

FIG. 10 illustrates scanning electron microscopy (SEM) images of various homometallic cyanide-containing inorganic polymers of Formula I. As seen from the image of FIG. 10a, FIG. 10b, and FIG. 10c, which were synthesized in 30 seconds, 2 minutes, or 55 minutes, respectively, as described in Examples 40, 41, and 42, respectively, the synthesis of these homometallic cyanide-containing inorganic polymers is nearly complete after a reaction duration of 30 seconds.

These compositions may be used, directly or indirectly, for preparation of an electrode (e.g., an anode). Such compositions may correspond to a slurry or ink applied on a current collector. The electrode corresponds to a mixture of the composition, a binder, an electrical conductive material, additives, and a solvent. The binder may be one or more components selected from the group consisting of a vinylfluoride/hexafluoropropylene copolymer, polyvinylidenefluoride (PVDF), polyacrylonitrile, polymethylmethacrylate, polytetrafluoroethylene, and mixtures thereof, and styrene butadiene rubber-based polymer. The electrical conductive material may be selected from a crystalline carbon, an amorphous carbon, or a mixture thereof. The conductive material may be selected from acetylene black, ketjen black, natural graphite, artificial graphite, carbon black, carbon fiber, carbon nanotubes and graphene. The solvent is selected from polar aprotic solvents such as N-methylpyrrolidinone, N, N-dimethyformamide, dimethyl acetamide and dimethylsufoxide. The preferred solvent is N-methylpyrrolidinone.

EXPERIMENTAL SECTION

Example 1

To a stirred solution of manganese chloride tetrahydrate (16.0 g, 80.0 mmoles) in deaerated water (40 g), a solution of potassium cyanide (12.0 g, 184 mmoles) in deaerated water (40 g) was dropwise added over 290 min under inert atmosphere of nitrogen (oxygen <0.1 ppm). The resulting mixture was stirred for an additional 15 min and then filtered over a 0.45 micron filter. The resulting green powder was washed with deaerated water (200 ml), rinsed with deaerated methanol (100 ml) and dried under vacuum to give 9.6 g of a green powder.

Example 2

To a stirred solution of manganese acetate tetrahydrate (19.6 g, 80.0 mmoles) in deaerated water (40 g), a solution of potassium cyanide (12.0 g, 184 mmoles) in deaerated water (40 g) was dropwise added over 300 min under inert atmosphere of nitrogen (oxygen <0.1 ppm). The resulting mixture was stirred for an additional 15 min and then filtered over a 0.45 micron filter. The resulting green powder was washed with deaerated water (300 ml), rinsed with deaerated methanol (200 ml) and dried under vacuum to give 9.35 g of a green powder.

Example 3

To a stirred solution of potassium cyanide (12.0 g, 184 mmoles) in deaerated water (40 g), a solution of manganese acetate tetrahydrate (19.6 g, 80.0 mmoles) in deaerated water (40 g) was dropwise added over 300 min under inert atmosphere of nitrogen (oxygen <0.1 ppm). The resulting mixture was stirred for an additional 15 min and then filtered over a 0.45 micron filter. The resulting green powder was washed with deaerated water (200 ml), rinsed with deaerated methanol (100 ml) and dried under vacuum to give 10.4 g of a green powder.

Example 4

To a stirred solution of manganese acetate tetrahydrate (9.8 g, 40.0 mmoles) in deaerated water (40 g), a solution of potassium cyanide (12.0 g, 184 mmoles) in deaerated water (40 g) was dropwise added over 325 min under inert atmosphere of nitrogen (oxygen <0.1 ppm). The resulting mixture was stirred for an additional 20 min and then filtered over a 0.45 micron filter. The resulting green powder was washed with deaerated water (100 ml), rinsed with deaerated methanol (100 ml) and dried under vacuum to give 6.6 g of a green powder.

Example 5

To a stirred solution of manganese acetate tetrahydrate (9.8 g, 40.0 mmoles) in deaerated water (40 g), a solution of potassium cyanide (12.0 g, 184 mmoles) in deaerated water (40 g) was dropwise added over 130 min under inert atmosphere of nitrogen (oxygen <0.1 ppm). The resulting mixture was stirred for an additional 30 min and then filtered over a 0.45 micron filter. The resulting green powder was washed with deaerated water (100 ml), rinsed with deaerated methanol (100 ml) and dried under vacuum to give 6.7 g of a green powder.

Example 6

To a stirred solution of manganese acetate tetrahydrate (4.9 g, 20.0 mmoles) in deaerated water (40 g), a solution of potassium cyanide (12.0 g, 184 mmoles) in deaerated water (40 g) was dropwise added over 135 min under inert atmosphere of nitrogen (oxygen <0.1 ppm). The resulting mixture was stirred for an additional 60 min and then filtered over a 0.45 micron filter. The resulting green powder was washed with deaerated water (100 ml), rinsed with deaerated methanol (100 ml) and dried under vacuum to give 3.05 g of a green powder.

Example 7

To a stirred solution of manganese acetate tetrahydrate (7.35 g, 30.0 mmoles) in deaerated water (40 g), a solution of potassium cyanide (12.0 g, 184 mmoles) in deaerated water (40 g) was dropwise added over 110 min under inert atmosphere of nitrogen (oxygen <0.1 ppm). The resulting mixture was stirred for an additional 15 min and then filtered over a 0.45 micron filter. The resulting green powder was washed with deaerated water (75 ml), rinsed with deaerated methanol (60 ml) and dried under vacuum to give 5.0 g of a green powder.

Example 8

To a stirred solution of manganese acetate tetrahydrate (12.25 g, 50.0 mmoles) in deaerated water (40 g), a solution of potassium cyanide (12.0 g, 184 mmoles) in deaerated water (40 g) was dropwise added over 110 min under inert atmosphere of nitrogen (oxygen <0.1 ppm). The resulting mixture was stirred for an additional 15 min and then filtered over a 0.45 micron filter. The resulting green powder was washed with deaerated water (75 ml), rinsed with deaerated methanol (60 ml) and dried under vacuum to give 8.2 g of a green powder.

Example 9

To a stirred solution of potassium cyanide (2.92 g, 45 mmoles) in deaerated water (20 g), a solution of manganese acetate tetrahydrate (3.7 g, 15.0 mmoles) in deaerated water (20 g) was dropwise added over 70 min under inert atmosphere of nitrogen (oxygen <0.1 ppm). Water (20 g) was added and the resulting mixture was stirred for an additional 20 min and then filtered over a 0.45 micron filter. The resulting green powder was washed with deaerated water (60 ml), rinsed with deaerated methanol (60 ml) and dried under vacuum to give 2.3 g of a green powder.

Example 10

To a stirred solution of potassium cyanide (6.0 g, 92 mmoles) in deaerated water (20 g), a solution of manganese acetate tetrahydrate (3.7 g, 15.0 mmoles) in deaerated water (20 g) was dropwise added over 20 min under inert atmosphere of nitrogen (oxygen <0.1 ppm). Water (20 g) was added and the resulting mixture was stirred for an additional 60 min and then filtered over a 0.45 micron filter. The resulting green powder was washed with deaerated water (75 ml), rinsed with deaerated methanol (75 ml) and dried under vacuum to give 2.4 g of a green powder.

Example 11

To a stirred solution of manganese chloride tetrahydrate (8.0 g, 40.0 mmoles) in deaerated water (100 g), a solution of potassium cyanide (6.0 g, 92 mmoles) in deaerated water (100 g) was dropwise added over 160 min under inert atmosphere of nitrogen (oxygen <0.1 ppm). The resulting mixture was stirred for an additional 25 min and then filtered over a 0.45 micron filter. The resulting green powder was washed with deaerated water (150 ml), rinsed with deaerated methanol (150 ml) and dried under vacuum to give 2.55 g of a green powder.

Example 12

To a stirred solution of manganese chloride tetrahydrate (16.0 g, 80.0 mmoles) in deaerated water (200 g), a solution of potassium cyanide (12.0 g, 184 mmoles) in deaerated water (200 g) was added over 1.0 min period under inert atmosphere of nitrogen (oxygen <0.1 ppm). The resulting mixture was stirred for an additional 20 min and then filtered over a 0.45 micron filter. The resulting green powder was washed with deaerated water (150 ml), rinsed with deaerated methanol (150 ml) and dried under vacuum to give 5.05 g of a green powder.

Example 13

To a stirred solution of manganese acetate tetrahydrate (9.8 g, 40.0 mmoles) in deaerated water (100 g), a solution of potassium cyanide (6.0 g, 92 mmoles) in deaerated water (100 g) was dropwise added over 240 min under inert atmosphere of nitrogen (oxygen <0.1 ppm). The resulting mixture was stirred for an additional 40 min and then filtered over a 0.45 micron filter. The resulting green powder was washed with deaerated water (200 ml), rinsed with deaerated methanol (100 ml) and dried under vacuum to give 4.2 g of a green powder.

Example 14

To a stirred solution of manganese acetate tetrahydrate (9.8 g, 40.0 mmoles) in deaerated water (100 g), a solution of potassium cyanide (6.0 g, 92 mmoles) in deaerated water (100 g) was added over 1.0 min period under inert atmosphere of nitrogen (oxygen <0.1 ppm). The resulting mixture was stirred for an additional 40 min and then filtered over a 0.45 micron filter. The resulting green powder was washed with deaerated water (75 ml), rinsed with deaerated methanol (75 ml) and dried under vacuum to give 4.8 g of a green powder.

Example 15

To a stirred solution of potassium cyanide (6.0 g, 92 mmoles) in deaerated water (100 g), a solution of manganese chloride tetrahydrate (8.0 g, 40.0 mmoles) in deaerated water (100 g) was added over 1.0 min period under inert atmosphere of nitrogen (oxygen <0.1 ppm). Water (20 g) was added and the resulting mixture was stirred for an additional 30 min and then filtered over a 0.45 micron filter. The resulting green powder was washed with deaerated water (75 ml), rinsed with deaerated methanol (75 ml) and dried under vacuum to give 3.4 g of a green powder.

Example 16

To a stirred solution of manganese acetate tetrahydrate (7.35 g, 30.0 mmoles) in deaerated water (20 g), a solution of potassium cyanide (6.0 g, 92 mmoles) in deaerated water (20 g) was added dropwise over 120 min under inert atmosphere of nitrogen (oxygen <0.1 ppm). The resulting mixture was stirred for an additional 20 min and then filtered over a 0.45 micron filter. The resulting green powder was washed with deaerated water (60 ml), rinsed with deaerated methanol (60 ml) and dried under vacuum to give 4.5 g of a green powder.

Example 17

To a stirred solution of manganese acetate tetrahydrate (12.25 g, 50.0 mmoles) in deaerated water (40 g), a solution of potassium cyanide (12.0 g, 184 mmoles) in deaerated water (40 g) was dropwise added over 40 min under inert atmosphere of nitrogen (oxygen <0.1 ppm). The resulting mixture was stirred for an additional 180 min and then filtered over a 0.45 micron filter. The resulting green powder was washed with deaerated water (60 ml), rinsed with deaerated methanol (100 ml) and dried under vacuum to give 8.5 g of a green powder.

Example 18

To a stirred solution of potassium cyanide (12.0 g, 184 mmoles) in deaerated water (40 g), a solution of manganese acetate tetrahydrate (12.25 g, 50.0 mmoles) in deaerated water (40 g) was dropwise added over 40 min under inert atmosphere of nitrogen (oxygen <0.1 ppm). The resulting mixture was stirred for an additional 180 min and then filtered over a 0.45 micron filter. The resulting green powder was washed with deaerated water (75 ml), rinsed with deaerated methanol (60 ml) and dried under vacuum to give 8.3 g of a green powder.

Example 19

To a stirred solution of manganese acetate tetrahydrate (7.35 g, 30.0 mmoles) in deaerated water (40 g), a solution of sodium cyanide (9.0 g, 184 mmoles) in deaerated water (40 g) was added dropwise over 255 min under inert atmosphere of nitrogen (oxygen <0.1 ppm). The resulting mixture was stirred for an additional 15 min and then filtered over a 0.45 micron filter. The resulting blue powder was washed with deaerated water (75 ml), rinsed with deaerated methanol (75 ml) and dried under vacuum to give 3.9 g of a blue powder.

Example 20

To a stirred solution of manganese acetate tetrahydrate (4.9 g, 20.0 mmoles) in deaerated water (20 g), a solution of sodium cyanide (9.0 g, 184 mmoles) in deaerated water (25 g) was added dropwise over 195 min under inert atmosphere of nitrogen (oxygen <0.1 ppm). Methanol (15 ml) was added and the resulting mixture was stirred for an additional 30 min and then filtered over a 0.45 micron filter. The resulting blue powder was washed with deaerated water (75 ml), rinsed with deaerated methanol (75 ml) and dried under vacuum to give 2.9 g of a blue powder.

Example 21

To a stirred solution of manganese acetate tetrahydrate (7.35 g, 30.0 mmoles) in deaerated water (20 g), a solution of sodium cyanide (4.5 g, 92 mmoles) in deaerated water (20 g) was added dropwise over 115 min under inert atmosphere of nitrogen (oxygen <0.1 ppm). The resulting mixture was stirred for an additional 120 min and then filtered over a 0.45 micron filter. The resulting blue powder was washed with deaerated water (75 ml), rinsed with deaerated methanol (75 ml) and dried under vacuum to give 4.7 g of a blue powder.

Example 22

To a stirred solution of manganese acetate tetrahydrate (12.2 g, 50.0 mmoles) in deaerated water (40 g), a solution of sodium cyanide (9.0 g, 184 mmoles) in deaerated water (40 g) was added dropwise over 40 min under inert atmosphere of nitrogen (oxygen <0.1 ppm). The resulting mixture was stirred for an additional 180 min and then filtered over a 0.45 micron filter. The resulting blue powder was washed with deaerated water (75 ml), rinsed with deaerated methanol (75 ml) and dried under vacuum to give 8.2 g of a blue powder.

Example 23

To a stirred solution of manganese acetate tetrahydrate (12.2 g, 50.0 mmoles) in deaerated water (40 g), a solution of sodium cyanide (9.0 g, 184 mmoles) in deaerated water (40 g) was added over 1.0 min period under inert atmosphere of nitrogen (oxygen <0.1 ppm). The resulting mixture was stirred for an additional 25 min and then filtered over a 0.45 micron filter. The resulting blue powder was washed with deaerated water (75 ml), rinsed with deaerated methanol (75 ml) and dried under vacuum to give 8.3 g of a blue powder.

Example 24

To a stirred solution of manganese acetate tetrahydrate (12.2 g, 50.0 mmoles) in deaerated water (25 g), a solution of sodium cyanide (9.0 g, 184 mmoles) in deaerated water (25 g) was added over 1.0 min period under inert atmosphere of nitrogen (oxygen <0.1 ppm). The resulting mixture was stirred for an additional 210 min and then filtered over a 0.45 micron filter. The resulting blue powder was washed with deaerated water (75 ml), rinsed with deaerated methanol (75 ml) and dried under vacuum to give 8.3 g of a blue powder.

Example 25

To a stirred solution of manganese acetate tetrahydrate (7.35 g, 30.0 mmoles) in deaerated water (20 g) and deaerated methanol (20 ml), a solution of sodium cyanide (9.0 g, 184 mmoles) in deaerated water (40 g) was added dropwise over 115 min under inert atmosphere of nitrogen (oxygen <0.1 ppm). The resulting mixture was stirred for an additional 70 min and then filtered over a 0.45 micron filter. The resulting blue powder was washed with deaerated water (60 ml), rinsed with deaerated methanol (60 ml) and dried under vacuum to give 3.6 g of a blue powder.

Example 26

To a stirred solution of manganese acetate tetrahydrate (7.35 g, 30.0 mmoles) in deaerated water (40 g), a solution of sodium cyanide (4.5 g, 92 mmoles) in deaerated water (40 g) was added over 1.0 min period under inert atmosphere of nitrogen (oxygen <0.1 ppm). The resulting mixture was stirred for an additional 65 min and then filtered over a 0.45 micron filter. The resulting blue powder was washed with deaerated water (80 ml), rinsed with deaerated methanol (50 ml) and dried under vacuum to give 3.5 g of a blue powder.

Example 27

To a stirred solution of manganese acetate tetrahydrate (7.35 g, 30.0 mmoles) in deaerated water (20 g), a solution of sodium cyanide (4.5 g, 92 mmoles) in deaerated water (20 g) was added over 1.0 min period under inert atmosphere of nitrogen (oxygen <0.1 ppm). The resulting mixture was stirred for an additional 65 min and then filtered over a 0.45 micron filter. The resulting blue powder was washed with deaerated water (80 ml), rinsed with deaerated methanol (50 ml) and dried under vacuum to give 2.9 g of a blue powder.

Example 28

To a stirred solution of manganese acetate tetrahydrate (9.8 g, 40.0 mmoles) in deaerated water (40 g), a solution of sodium cyanide (9.0 g, 184 mmoles) in deaerated water (40 g) was added over 1.0 min period under inert atmosphere of nitrogen (oxygen <0.1 ppm). The resulting mixture was stirred for an additional 30 min and then filtered over a 0.45 micron filter. The resulting blue powder was washed with deaerated water (80 ml), rinsed with deaerated methanol (50 ml) and dried under vacuum to give 5.75 g of a blue powder.

Example 32

To a stirred solution of manganese acetate tetrahydrate (7.35 g, 30.0 mmoles) in deaerated water (60 g), a solution of sodium cyanide (7.35 g, 153.0 mmoles) in deaerated water (50 g) was added over 1.0 min period at 11° C. under inert atmosphere of nitrogen (oxygen <0.1 ppm). The resulting mixture was stirred for an additional 120 min and then filtered over a 0.45 micron filter. The resulting blue powder was washed with deaerated water (120 ml), rinsed with deaerated methanol (120 ml) and dried under vacuum to give 4.0 g of a blue powder.

Example 33

To a stirred solution of manganese acetate tetrahydrate (7.35 g, 30.0 mmoles) in deaerated water (60 g), a solution of sodium cyanide (7.35 g, 153.0 mmoles) in deaerated water (40 g) was added over 1.0 min period at 15° C. under inert atmosphere of nitrogen (oxygen <0.1 ppm). The resulting mixture was stirred for an additional 60 min. Water (65 g) was dropwise added over 30 min. and then the mixture was stirred for an additional 10 min. The resulting mixture was filtered over a 0.45 micron filter, washed with deaerated water (110 ml), rinsed with deaerated methanol (100 ml) and dried under vacuum to give 4.65 g of a blue powder.

Example 34

To a stirred solution of manganese acetate tetrahydrate (7.35 g, 30.0 mmoles) in deaerated water (60 g), a solution of sodium cyanide (8.08 g, 168.0 mmoles) in deaerated water (40 g) was added over 1.0 min period at 15° C. under inert atmosphere of nitrogen (oxygen <0.1 ppm). The resulting mixture was stirred for an additional 60 min. and then filtered over a 0.45 micron filter, washed with deaerated water (110 ml), rinsed with deaerated methanol (100 ml) and dried under vacuum to give 3.7 g of a blue powder.

Example 35

To a stirred solution of manganese acetate tetrahydrate (7.35 g, 30.0 mmoles) in deaerated water (60 g), a solution of sodium cyanide (9.0 g, 184.0 mmoles) in deaerated water (40 g) was added over 1.0 min period at 15° C. under inert atmosphere of nitrogen (oxygen <0.1 ppm). The resulting mixture was stirred for an additional 30 min. Water (100 g) was dropwise added over 45 min. and then the mixture was stirred for an additional 15 min. The resulting mixture was filtered over a 0.45 micron filter, washed with deaerated water (120 ml), rinsed with deaerated methanol (70 ml) and dried under vacuum to give 4.25 g of a blue powder.

Example 36

To a stirred solution of manganese acetate tetrahydrate (7.35 g, 30.0 mmoles) in deaerated water (30 g), a solution of sodium cyanide (5.15 g, 107.0 mmoles) in deaerated water (30 g) was added over 1.0 min period at 15° C. under inert atmosphere of nitrogen (oxygen <0.1 ppm). The resulting mixture was stirred for an additional 15 min. Water (60 g) was dropwise added over 75 min. and then the mixture was stirred for an additional 15 min. The resulting mixture was filtered over a 0.45 micron filter, washed with deaerated water (120 ml), rinsed with deaerated isopropanol (60 ml) and dried under vacuum to give 5.0 g of a blue powder.

Example 37

To a stirred solution of manganese acetate tetrahydrate (7.35 g, 30.0 mmoles) in deaerated water (30 g), a solution of sodium cyanide (4.85 g, 101.0 mmoles) in deaerated water (20 g) was added over 1.0 min period at 14° C. under inert atmosphere of nitrogen (oxygen <0.1 ppm). The resulting mixture was stirred for an additional 30 min. and then filtered over a 0.45 micron filter, washed with deaerated water (100 ml), rinsed with deaerated isopropanol (100 ml) and dried under vacuum to give 4.0 g of a blue powder.

Example 38

To a stirred solution of manganese acetate tetrahydrate (7.35 g, 30.0 mmoles) in deaerated water (30 g), a solution of potassium cyanide (6.43, 101.0 mmoles) in deaerated water (30 g) was added over 1.0 min period at 15° C. under inert atmosphere of nitrogen (oxygen <0.1 ppm). The resulting mixture was stirred for an additional 30 min. and then filtered over a 0.45 micron filter. The green powder was washed with deaerated water (150 ml), rinsed with deaerated isopropanol (100 ml) and dried under vacuum to give 4.15 g of a green powder.

Example 39

To a stirred solution of manganese acetate tetrahydrate (7.35 g, 30.0 mmoles) in deaerated water (30 g), a solution of sodium cyanide (4.85 g, 101.0 mmoles) in deaerated water (22 g) was added over 1.0 min period at 15° C. under inert atmosphere of nitrogen (oxygen <0.1 ppm). The resulting mixture was stirred for an additional 30 min. Water (50 g) was dropwise added over 30 min. and then the mixture was stirred for an additional 15 min. The resulting mixture was filtered over a 0.45 micron filter, the powder was washed with deaerated water (200 ml), rinsed with deaerated methanol (50 ml) and dried under vacuum to give 4.9 g of a blue powder.

Example 40

To a stirred solution of manganese acetate tetrahydrate (7.35 g, 30.0 mmoles) in deaerated water (30 g), a solution of sodium cyanide (4.85 g, 101.0 mmoles) in deaerated water (22 g) was added over 30 second period at −7° C. under inert atmosphere of nitrogen (oxygen <0.1 ppm). The resulting mixture was filtered over a 0.45 micron filter, the powder was washed with deaerated water (200 ml), rinsed with deaerated methanol (50 ml) and dried under vacuum to give 4.9 g of a blue powder.

Example 41

To a stirred solution of manganese acetate tetrahydrate (7.35 g, 30.0 mmoles) in deaerated water (30 g), a solution of sodium cyanide (4.85 g, 101.0 mmoles) in deaerated water (22 g) was added over 2.0 min period at −7° C. under inert atmosphere of nitrogen (oxygen <0.1 ppm). The resulting mixture was filtered over a 0.45 micron filter, the powder was washed with deaerated water (200 ml), rinsed with deaerated methanol (50 ml) and dried under vacuum to give 4.9 g of a blue powder.

Example 42

To a stirred solution of manganese acetate tetrahydrate (7.35 g, 30.0 mmoles) in deaerated water (30 g), a solution of sodium cyanide (4.85 g, 101.0 mmoles) in deaerated water (22 g) was added over 55.0 min period at −7° C. under inert atmosphere of nitrogen (oxygen <0.1 ppm). The resulting mixture was filtered over a 0.45 micron filter, the powder was washed with deaerated water (200 ml), rinsed with deaerated methanol (50 ml) and dried under vacuum to give 4.9 g of a blue powder.

Example 43

The active material selected from one of the above-described examples was thoroughly mixed with carbon black by grinding in a mortar pestle. The resulting grey powder was then mixed with a solution of polyvinylidene fluoride (Kynar HSV900) in N-methyl-2-pyrolidinone to produce a black slurry. The mass ratio of active material, carbon black and polyvinylidene fluoride was 80:10:10. A thin layer of the thus obtained slurry was coated on a carbon cloth current collector and the resulting electrode was dried under vacuum. The resulting anode electrode is used without further treatment in electrochemical cell setups.

Example 44

The active material selected from one of the above-described examples was thoroughly mixed with carbon black by grinding in a mortar pestle. The resulting grey powder was then mixed with a solution of polyvinylidene fluoride (Kynar 761) in N-methyl-2-pyrolidinone to produce a black slurry. The mass ratio of active material, carbon black and polyvinylidene fluoride was 80:10:10. A thin layer of the thus obtained slurry was coated on a carbon cloth current collector and the resulting electrode was dried under vacuum. The resulting anode electrode is used without further treatment in electrochemical cell setups.

Example 45

The active material selected from one of the above-described examples was thoroughly mixed with carbon black by grinding in a mortar pestle. The resulting grey powder was then mixed with a solution of polyvinylidene fluoride in N-methyl-2-pyrolidinone to produce a black slurry. The mass ratio of active material, carbon black and polyvinylidene fluoride was 70:20:10. A thin layer of the thus obtained slurry was coated on a carbon cloth current collector and the resulting electrode was dried under vacuum. The resulting anode electrode is used without further treatment in electrochemical cell setups.

Example 46

The active material selected from one of the above-described examples was thoroughly mixed with carbon black and graphite by grinding in a mortar pestle. The resulting grey powder was then mixed with a solution of polyvinylidene fluoride in N-methyl-2-pyrolidinone to produce a black slurry. The mass ratio of active material, carbon black, polyvinylidene fluoride, and graphite was 80:9:9:2. A thin layer of the thus obtained slurry was coated on a carbon cloth current collector and the resulting electrode was dried under vacuum. The resulting anode electrode is used without further treatment in electrochemical cell setups.

DISCUSSION

For some embodiments of the present invention implementing Formula I (for example embodiments lacking isocyanide NC), a chemical formula for the embodiment represents a material in which there is a presence of a monoclinic crystalline structure phase that is not consistent with metal hexacyanometalate complexes, which are known to have face-centered cubic structures. The X-ray diffraction spectra of materials of the present invention, see, for example FIG. 2, provide clear evidence of the presence of monoclinic crystalline structure phase.

In addition, for those embodiments of the present invention having a chemical formula that include non-zero isocyanide groups (e.g., p>0 in Formula I), metal hexacyanometalate materials do not include any isocyanide groups. The data and background chemistry and syntheses strongly support the presence of isocyanide groups in some embodiments of Formula I for the following reasons.

A fundamental difference in the disclosed example methods as compared to conventional metal hexacyanometalate syntheses is that the disclosed example methods all employ just a metal cation (e.g., manganese) and cyanide anions. These two chemical species are present in a reactor vessel at high concentrations. It is not believed that the reaction to form the composition described here proceeds by a stepwise synthesis, in which during a first step these species react to form some quantity of hexacyanomanganate complexes and leaving some unreacted manganese cations, followed by a second step corresponding to the reaction between hexacyanomanganate complexes and remaining unreacted manganese to form a solid material having a composition of $Mn[Mn(CN)_6]$. Such a stepwise reaction mechanism is entropically unfavorable, and therefore, energetically unfavorable, for all of the cyanide anion precursors to bond selectively with a fraction of all of the manganese cation precursors.

Rather, it is entropically favored for the cyanide anion precursors to react in a first step with all of the available manganese cation precursors, forming manganese cyanide complexes containing varying numbers of cyanides. Then, in a second step which may begin even before the first step is completed, these manganese cyanide complexes bond to one another, forming a solid material in which individual complexes do not contain a full cyanide bonding structure of six cyanides. When the formation of the solid product composition proceeds in this way, a manganese cation that was initially bonded to fewer than six cyanides in a first complex will also bond to the nitrogen ends of the cyanide groups that were already bonded to the manganese cation of a second complex before the two complexes reacted together during the formation of the solid product composition. Therefore, it is entropically favored that there are some isocyanide groups in the final solid compound, which results in a composition including $Mn[Mn(CN)_{6-p}(NC)_p]$ with some number p of isocyanides.

This process described in connection with synthesis of a composite of Formula I having isocyanide groups can never happen during a metal hexacyanometallate synthesis because the precursors to metal hexacyanometalates are always hexacyanometalate complexes such as $Fe(CN)_6$, $Co(CN)_6$, $Cr(CN)_6$, $Mn(CN)_6$, and similar. In those precursor complexes, all of the cyanides are already bonded by their carbon ends to the same metal cation, so when the reaction to make the metal hexacyanometalate happens, the final composition must be $M'[M''(CN)_6]$ (where M' and M'' are metals), but it can never be $M'[M''(CN)_{6-p}(NC)_p]$ with some non-zero number p of isocyanides.

In support of this, reference is made to "HANDBOOK OF PREPARATIVE INORGANIC CHEMISTRY", vol. 2, 2nd ed., Georg Brauer, 1965, which is hereby expressly incorporated by reference thereto for all purposes. Brauer teaches on pages 1473-4 that the synthesis of $Mn(CN)_6$ as free complexes in solution requires at least half an hour at a temperature of 70-80 degrees Celsius. In contrast, many of the disclosed syntheses, such as described in examples 40-42, and as shown in FIG. 10a-FIG. 10c, are nearly complete in about 30 seconds (the longer times for stirring are chosen to allow the yield of the reaction to approach 100% if a minority of the precursors take longer to react) at temperatures of about −7 to 20 degrees Celsius. In general, chemical reactions are known to proceed more quickly at higher temperatures. This leads to the conclusion that for embodiments of the composition reported here, the synthesis reaction proceeds at so fast a rate that there is not enough time to allow the formation of $Mn(CN)_6$ complexes in solution before the onset of the reaction creating the solid product composition, and instead, the product material was formed from manganese cyanide complexes having varying numbers of cyanides, resulting in a final composition having both cyanide and isocyanide groups.

As described, in Formula I the maximum value of p is three, as in this case, a manganese with six bonds is bonded to three cyanide groups and three isocyanide groups. As there are six total bonds, in the case of p>3, the particular manganese under consideration is in a site in the crystal structure that is on the nitrogen-ends of the cyanide groups of adjacent manganese complexes. For example, the case of p=5, having a corresponding composition of $Mn[Mn(CN)(NC)_5]$ is equivalent to the case of p=1, having a corresponding composition of $Mn[Mn(CN)_5(NC)]$ for an adjacent Mn under consideration.

Also described, some syntheses were performed in which manganese salt is slowly added to cyanide solution, such as in examples 3 and 9, in which cyanide anions were added in about 300 and 70 minutes, respectively. In such cases, it may be possible that $Mn(CN)_6$ complexes formed before the solid material was formed, so the composition may or may not be any isocyanide groups. For this reason, the present specification and claims includes a range of $0 \leq p \leq 3$. For these instances, and in the case that p=0, the embodiments are different from previously described metal hexacyanometalates at least because of the corresponding crystalline structure (e.g., monoclinic) as at least a component of the material.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A material, comprising:
   at least one composition represented by Formula I:

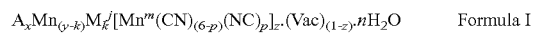

$$A_x Mn_{(y-k)} M_k^j [Mn^m(CN)_{(6-p)}(NC)_p]_z \cdot (Vac)_{(1-z)} \cdot nH_2O \quad \text{Formula I}$$

wherein, in Formula I, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and wherein $0 < j \leq 4$, $0 \leq k \leq 0.1$, $0 < p \leq 3$, $0 < x \leq 4$, $0 < y \leq 1$, $0 < z < 1$, and $0 \leq n \leq 6$; wherein $x+2(y-k)+jk+(m-6)z=0$; and
   wherein Formula I includes one or more $Mn(CN)_{(6-p)}(NC)_p$ complexes each including an Mn atom, and wherein p is an average number of NC groups found in said one or more $Mn(CN)_{(6-p)}(NC)_p$ complexes; and wherein m is an average valence of said Mn atoms found in said one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes said Mn atom bonded to a plurality of cyanide groups and bonded to one or more isocyanide groups.

2. The material of claim 1 wherein said composition includes one or more crystal structures selected from the group consisting of a face-centered cubic structure, a monoclinic structure, a mixture of a face-centered cubic structure and a monoclinic structure, and combinations thereof.

3. The material of claim 1 wherein said one or more crystal structures preferably include grains having a size greater than 200 nm.

4. The material of claim 3 wherein said size is more preferably greater than 1 micron.

5. The material of claim 1 wherein z is greater than 0.8.

6. The material of claim 5 wherein z is more preferably greater than 0.9.

7. An electrode, comprising:
a current collector; and
a composite applied on said current collector, said composite including an electrochemically active material having a composition, a binder, and an electrically conductive material, wherein said composition comprises at least one composition represented by Formula I:

$$A_x Mn_{(y-k)} M'_k [Mn'''(CN)_{(6-p)}(NC)_p]_z \cdot (Vac)_{(1-z)} \cdot n H_2 O \quad \text{Formula I}$$

wherein, in Formula I, each A is an independently selected alkali metal Li, Na, or K; and each dopant M may optionally be at least one independently selected alkaline earth metal Mg or Ca, post-transition metal Al, Ga, In, Sn, or Pb or transition metal Sc, Ti, V, Cr, Fe, Co, Ni, Cu, Zn, Pd, Ag, or Cd having an average valence j; and wherein $0<j\leq4$, $0\leq k\leq0.1$, $0<p\leq3$, $0<x\leq4$, $0<y\leq1$, $0<z<1$, and $0\leq n\leq6$; wherein $x+2(y-k)+jk+(m-6)z=0$; and wherein Formula I includes one or more $Mn(CN)_{(6-p)}(NC)_p$ complexes each including an Mn atom, and wherein p is an average number of NC groups found in said one or more $Mn(CN)_{(6-p)}(NC)_p$ complexes; and wherein m is an average valence of said Mn atoms found in said one or more $Mn(CN)_{6-p}(NC)_p$ complexes; and wherein (Vac) identifies a $Mn(CN)_{(6-p)}(NC)_p$ vacancy, and wherein each particular $Mn(CN)_{(6-p)}(NC)_p$ complex includes said Mn atom bonded to a plurality of cyanide groups and bonded to one or more isocyanide groups.

8. The electrode of claim 7 wherein said composite further includes an additive.

9. The electrode of claim 7 wherein said binder includes one or more components selected from the group consisting of vinylfluoride/hexafluoropropylene copolymer, polyvinylidenefluoride (PVDF), polyacrylonitrile, polymethylmethacrylate, polytetrafluoroethylene, a mixture thereof, and styrene butadiene rubber-based polymer.

10. The electrode of claim 7 wherein said electrical conductive material includes one or more components selected from the group consisting of a graphitic carbon, an amorphous carbon, or a mixture thereof.

* * * * *

UNITED STATES PATENT AND TRADEMARK OFFICE
CERTIFICATE OF CORRECTION

| | | |
|---|---|---|
| PATENT NO. | : 9,099,740 B1 | Page 1 of 1 |
| APPLICATION NO. | : 14/523825 | |
| DATED | : August 4, 2015 | |
| INVENTOR(S) | : Shahrokh Motallebi et al. | |

It is certified that error appears in the above-identified patent and that said Letters Patent is hereby corrected as shown below:

In the Specification

After Column 1, Line 14, add:

-- STATEMENT REGARDING FEDERALLY SPONSORED RESEARCH OR DEVELOPMENT

This invention was made with Government support under Award No. DE-AR0000300, awarded by the Advanced Research Projects Agency – Energy (ARPA-E), U.S. Department of Energy. The Government has certain rights in this invention. --.

Signed and Sealed this
Fifteenth Day of March, 2016

Michelle K. Lee
*Director of the United States Patent and Trademark Office*